(12) United States Patent
Kanemoto et al.

(10) Patent No.: US 8,756,702 B2
(45) Date of Patent: Jun. 17, 2014

(54) ELECTRONIC APPARATUS, INFORMATION PROCESSING METHOD, AND PROGRAM

(75) Inventors: Toshinori Kanemoto, Kanagawa (JP); Tadashi Morita, Tokyo (JP)

(73) Assignee: Sony Corporation, Tokyo (JP)

(*) Notice: Subject to any disclaimer, the term of this patent is extended or adjusted under 35 U.S.C. 154(b) by 639 days.

(21) Appl. No.: 12/309,475

(22) PCT Filed: Jul. 27, 2007

(86) PCT No.: PCT/JP2007/064730
§ 371 (c)(1),
(2), (4) Date: Oct. 30, 2009

(87) PCT Pub. No.: WO2008/013251
PCT Pub. Date: Jan. 31, 2008

(65) Prior Publication Data
US 2010/0049977 A1    Feb. 25, 2010

(30) Foreign Application Priority Data
Jul. 27, 2006 (JP) .................................. 2006-204825

(51) Int. Cl.
*G06F 17/30* (2006.01)
(52) U.S. Cl.
USPC .............. 726/27; 726/30; 713/169; 713/170; 711/163; 707/708; 707/802
(58) Field of Classification Search
None
See application file for complete search history.

(56) References Cited

U.S. PATENT DOCUMENTS

| 5,461,217 | A | * | 10/1995 | Claus | 235/380 |
| 6,003,113 | A | * | 12/1999 | Hoshino | 711/106 |
| 6,052,690 | A | * | 4/2000 | de Jong | 1/1 |
| 6,073,238 | A | * | 6/2000 | Drupsteen | 726/20 |
| 6,220,510 | B1 | * | 4/2001 | Everett et al. | 235/380 |

(Continued)

FOREIGN PATENT DOCUMENTS

| EP | 1 189 157 A2 | 3/2002 |
| JP | 2005-285056 | 10/2005 |
| JP | 2005-316992 | 11/2005 |
| WO | WO-2007/145366 A1 | 12/2007 |

OTHER PUBLICATIONS

P. Hanáček, "Security of Electronic Money," Springer-Verlag Berlin Heidelberg, SOFSEM'98, pp. 107-121, 1998.*

(Continued)

*Primary Examiner* — Nadia Khoshnoodi
*Assistant Examiner* — Robert Leung
(74) *Attorney, Agent, or Firm* — Rader, Fishman & Grauer PLLC

(57) ABSTRACT

The present invention relates to an electronic apparatus, an information processing method, and a program that allow a provision server of an application to be capable of easily causing an electronic apparatus having an IC chip to manage data. When a service-issuing command transmitted from a service-issuing terminal 11 is received, in a service-issuing function 21 of an IC card 2, information indicating a service data structure and a program describing a processing sequence that correspond to an identifier transmitted as a command parameter are acquired from a service definition database 23. In the service-issuing function 21, IC-card internal processing is performed, and a service data structure for managing data to be used for receiving the provision of a specific application is prepared in a file system 22. The present invention can be applied to an apparatus having an IC chip.

7 Claims, 15 Drawing Sheets

(56) References Cited

U.S. PATENT DOCUMENTS

| | | | |
|---|---|---|---|
| 6,256,690 B1* | 7/2001 | Carper | 710/301 |
| 2003/0037264 A1 | 2/2003 | Ezaki et al. | |
| 2004/0049646 A1* | 3/2004 | Kusakabe et al. | 711/164 |
| 2004/0093281 A1* | 5/2004 | Silverstein et al. | 705/26 |
| 2006/0289659 A1* | 12/2006 | Mizushima | 235/492 |

OTHER PUBLICATIONS

International Search Report (PCT/ISA/210); International Application No. PCT/JP07/064730; Filed: Jul. 27, 2007.

English Language Translation of Japanese Office Action issued Jul. 22, 2010 for corresponding Japanese Application No. 2006-204825.

Notification of Transmittal of Translation of the International Preliminary Report on Patentability (Form PCT/IB/338); International Application No. PCT/JP2007/064730; International Filing Date: Jul. 27, 2007.

International Preliminary Report on Patentability (Translation)(Form PCT/IPEA/409); International Application No. PCT/JP2007/064730; International Filing Date: Jul. 27, 2007.

Hashimoto, J., et al, "Tamokuteki IC Card ni Okeru Policy Control Shuho no Teian / Policy Control Method for Multi Purpose Smart Card Platform," pp. 17 to 24, Document No. XP003020716, Ieice Technical Report vol. 100, No. 541, Jan. 5, 2001.

Extended European Search Report issued Dec. 12, 2009 for corresponding European Application No. 07 79 1424.

* cited by examiner

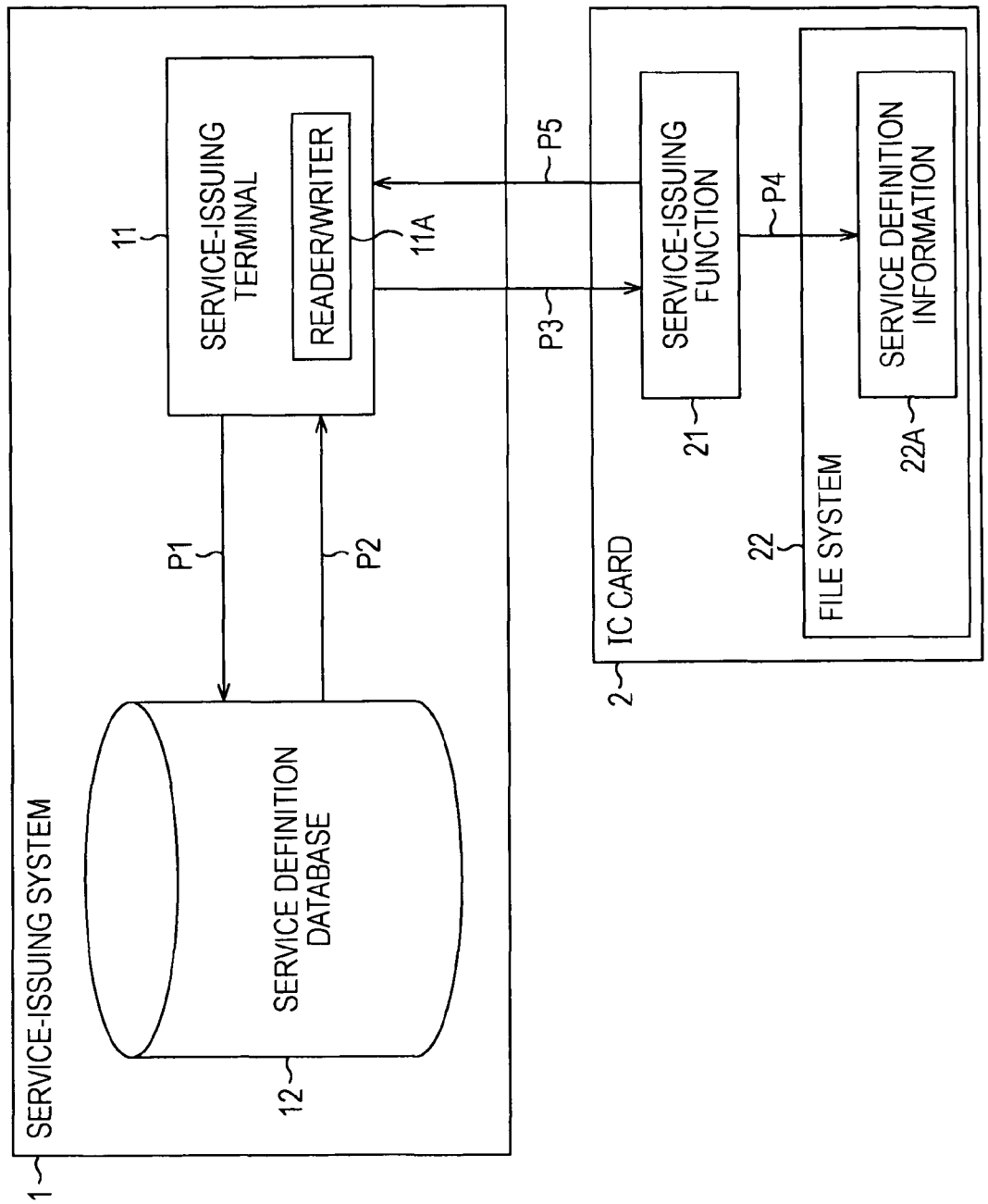

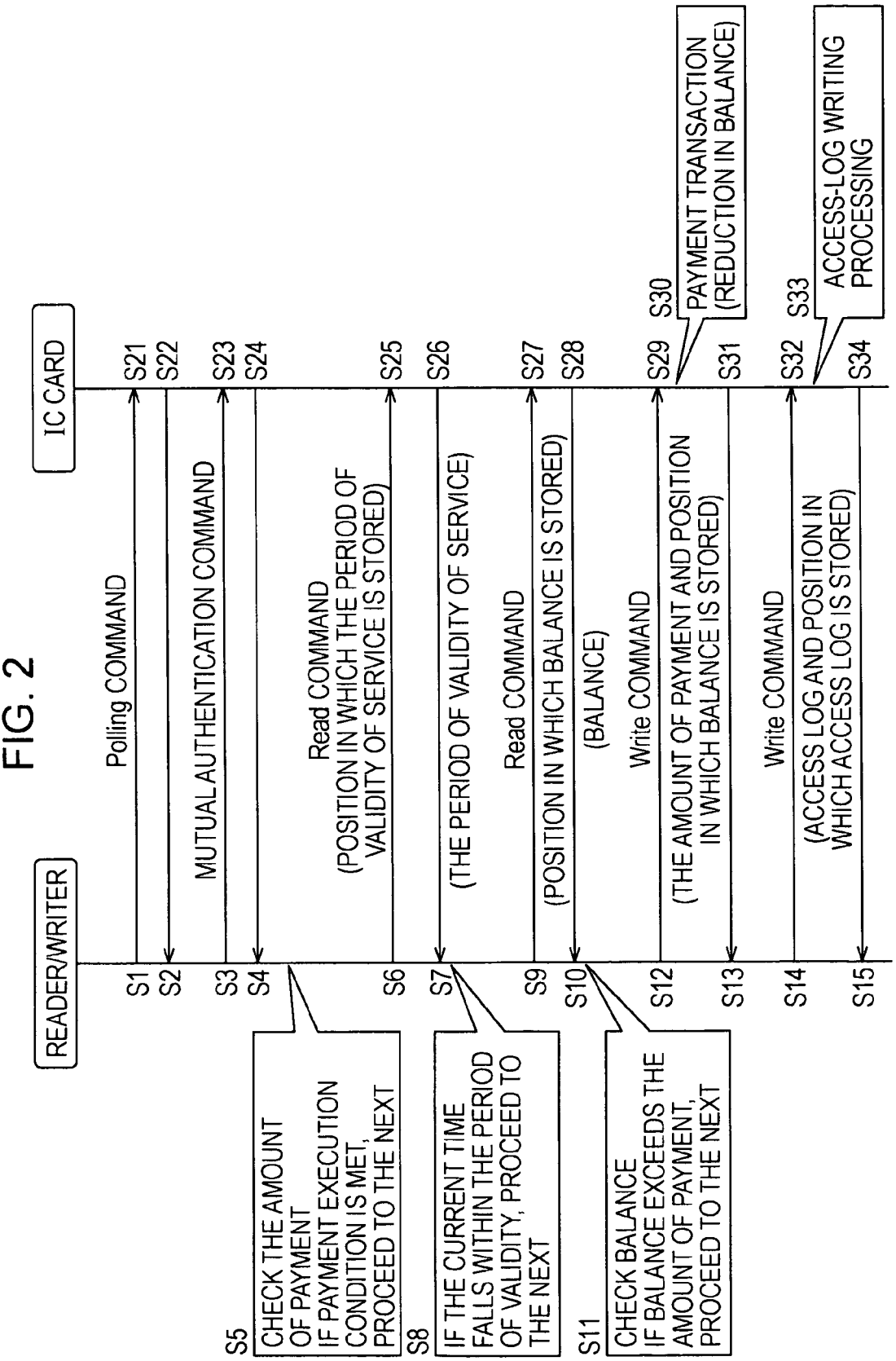

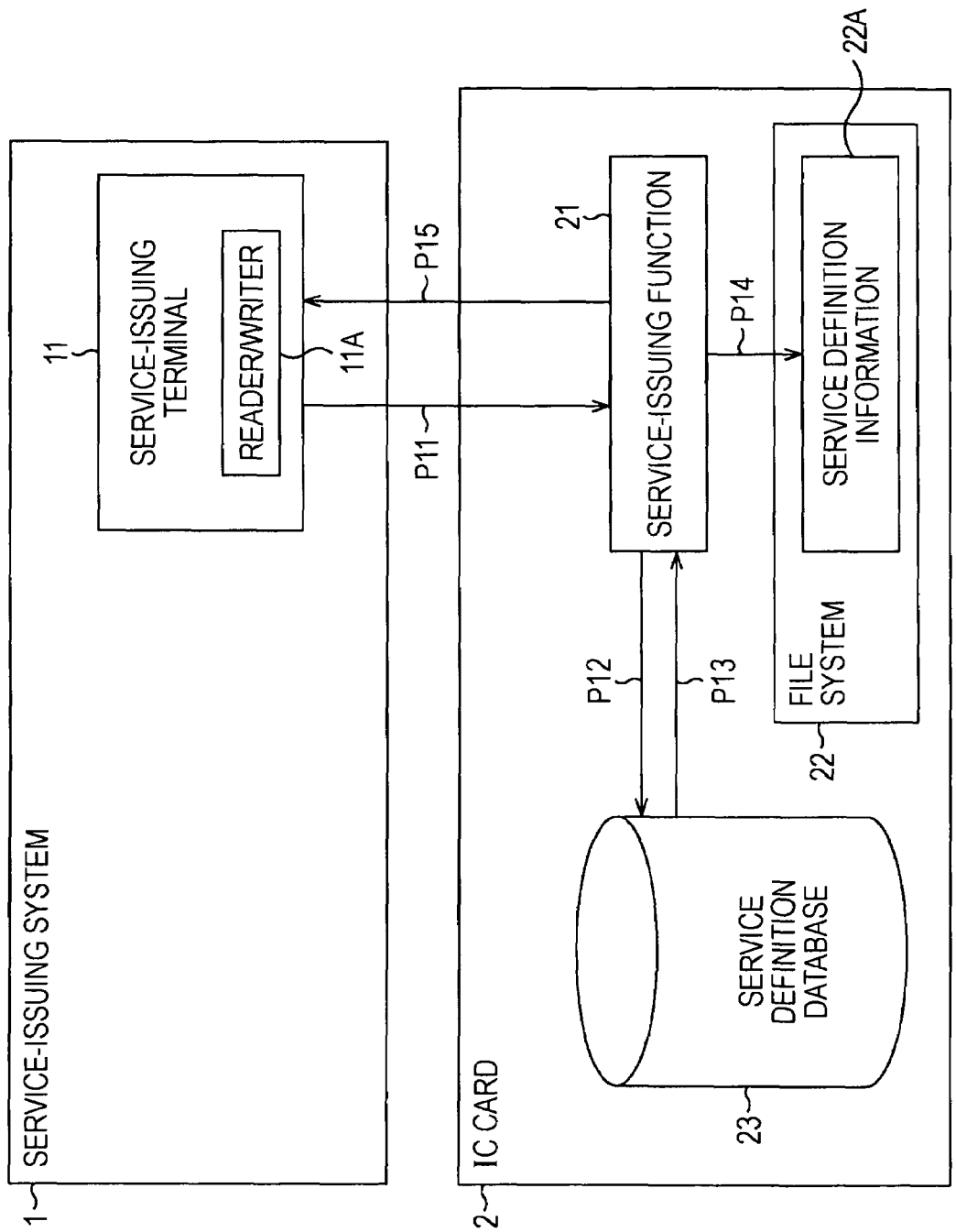

FIG. 4

| APPLICATION / SERVICE DEFINITION ITEM | PREPAID ELECTRONIC MONEY | CREDIT | DEBIT/ CASH CARD | POINT/ STAMP CARD | TICKET/COUPON/COMMUTATION TICKET | WRITTEN GUARANTEE | COMMUTER PASS | PARTNER CONFIRMATION/ACCESS CONTROL |
|---|---|---|---|---|---|---|---|---|
| SERVICE VALUE | BALANCE | LOAN (AMOUNT OF DEBT) | BALANCE/ LOAN | CUMULATIVE BALANCE | THE NUMBER OF TICKETS | 1 | NO LIMIT | NO LIMIT |
| CONSTRAINT ON SERVICE VALUE | 0 OR MORE UPPER LIMIT | 0 OR MORE LOWER LIMIT | LOWER LIMIT UPPER LIMIT | 0 OR MORE UPPER LIMIT | 0 OR MORE UPPER LIMIT | FIXED VALUE | 0 OR MORE | 0 OR MORE |
| PAYMENT SEQUENCE | SUBTRACTION | SUBTRACTION | ADDITION AND SUBTRACTION | SUBTRACTION | SUBTRACTION | ABSENCE | SUBTRACTION FROM MAXIMUM VALUE BY ONE | SUBTRACTION FROM MAXIMUM VALUE BY ONE |
| PAYMENT EXECUTION CONDITION | UPPER LIMIT | UPPER LIMIT | UPPER LIMIT | UPPER LIMIT/LOWER LIMIT/UNIT | UPPER LIMIT/LOWER LIMIT/UNIT | ABSENCE | ABSENCE | ABSENCE |
| CHARGE SEQUENCE | PRESENCE | PRESENCE | PRESENCE | PRESENCE | ABSENCE | ABSENCE | ABSENCE | ABSENCE |
| UNIT-OF-PAYMENT WRITING SEQUENCE | ABSENCE | ABSENCE | ABSENCE | ABSENCE | PRESENCE | PRESENCE | PRESENCE | PRESENCE |
| THE NUMBER OF UNITS OF PAYMENT THAT CAN BE STORED | 1 | 1 | 1 | 1 | PLURAL | PLURAL | 1 | 1 |
| CONSTRAINT ON PERIOD | FOR SERVICE DATA STRUCTURE | FOR SERVICE DATA STRUCTURE | FOR SERVICE DATA STRUCTURE | FOR SERVICE DATA STRUCTURE/UNIT OF PAYMENT | FOR A UNIT OF PAYMENT | FOR A UNIT OF PAYMENT | FOR SERVICE DATA STRUCTURE/UNIT OF PAYMENT | FOR SERVICE DATA STRUCTURE/UNIT OF PAYMENT |
| RECORDING OF PROCESSING HISTORY | PRESENCE | PRESENCE | PRESENCE | PRESENCE | PRESENCE | ABSENCE | SELECTABLE | SELECTABLE |
| PIN SEQUENCE | SELECTABLE | SELECTABLE | SELECTABLE | SELECTABLE | SELECTABLE | ABSENCE | SELECTABLE | SELECTABLE |

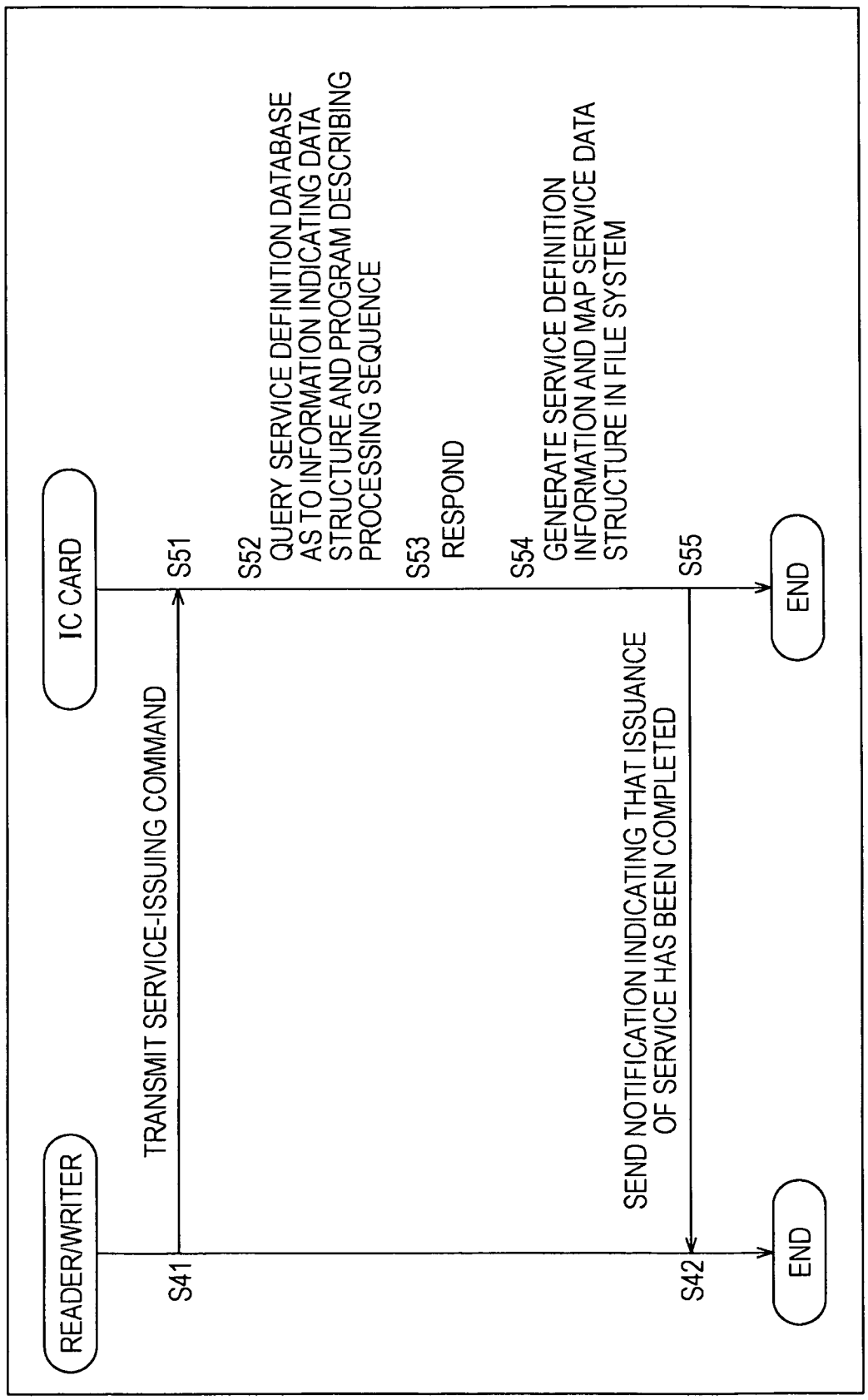

ELECTRONIC APPARATUS, INFORMATION PROCESSING METHOD, AND PROGRAM

TECHNICAL FIELD

The present invention relates to an electronic apparatus, an information processing method, and a program, and more particularly, to an electronic apparatus, an information processing method, and a program that allow a provision server of an application to be capable of easily causing an electronic apparatus having an IC chip to manage data.

BACKGROUND ART

The conventional issuance of services to IC cards has been performed, for example, in a case where an IC chip built in an IC card is FeliCa (trademark) and an installed OS (Operating System) is a general-purpose-type OS for applications such as a Felica OS, by a plurality of issuing commands being transmitted from an issuing-side terminal to the IC card (IC chip) and the plurality of issuing commands being executed in the IC card.

Here, a service represents a range, in which the entity of data, such as electronic money data itself, is managed in a file system of an IC card. For example, a file used in Windows (registered trademark) corresponds to a service. In order to access data managed in a certain service, it is necessary for a terminal side that intends to access the data to have the same key as an authorization key assigned for the certain service according to need.

The issuance of a service represents processing for, by ensuring an area of a memory in which information defining the service and user data such as electronic money data itself are to be stored and storing such information in the memory, creating a new service in a file system of an IC card.

When a service-issuing command is issued in an IC card, one data structure is expressed in accordance with a combination of units of user data for which the type of specific data structure, a method for accessing user data, and an authorization key to be used for authentication in the case of making access, which are defined for each OS, can be set. Accordingly, realization of a corresponding application can be achieved.

An application represents a service provided by a server (application server). Applications include a prepaid electronic money application, a credit application, a ticket application, and the like. A user of an IC card receives the issuance of a service corresponding to an application, the provision of which the user wishes to receive, by performing processing, such as holding his or her IC card over a reader/writer provided at a predetermined position of a service-issuing terminal. After that, the user is able to receive the provision of the application by utilizing the IC card that has received the issuance of the service.

In addition, conventionally, a command to be used in the operation of an application after the issuance of a service is received (a command transmitted from a reader/writer to an IC card) has been arranged to be defined for each processing operation (each function) that is performed by the IC card, such as a command for authentication, a command for reading, or a command for writing.

Thus, in a case where a certain application is realized by individual processing operations such as authentication of an IC card, reading of data from the IC card, and writing of data to the IC card, an application server needs to perform design processing and make preparations such that commands can be transmitted, in units of functions, to the IC card from a terminal used by a user in a case where the provision of the application is received. An OS of the IC card needs to interpret individual commands transmitted in units of functions from the reader/writer and to perform processing operations corresponding to the individual commands.

Meanwhile, in a case where an OS installed in an IC chip is a platform-type OS, such as a MULTOS (trademark) or Java (registered trademark) Card, the issuance of a service is performed when a service-issuing program prepared by an application server is downloaded into an IC card and the downloaded program is executed. In the service-issuing program, a data structure of the service that is necessary for realization of an application, a method for managing a key, and the like are defined by the application server.

In addition, after the issuance of the service is performed as described above, the application is realized when a program for operating the application is downloaded into the IC card and the downloaded program is executed.

FIG. 1 is an illustration for explaining a conventional service-issuing method for an IC card in which a general-purpose-type OS for applications is installed.

As shown in FIG. 1, the issuance of a service is performed by a service-issuing system 1. The service-issuing system 1 is, for example, a system that is provided by an application server and is constituted by a service-issuing terminal 11 and a service definition database 12. A reader/writer 11A is provided at a predetermined position of the housing of the service-issuing terminal 11. The service-issuing system 1 may be constituted by a single apparatus or may be constituted by a plurality of apparatuses.

An IC card 2 is a contactless IC card owned by a user who wishes to receive the provision of a specific application. A service-issuing function 21 and a file system 22 are implemented in the IC card 2. The service-issuing function 21 is a function implemented when a specific program is executed by an IC chip. The service-issuing function 21 interprets a service-issuing command transmitted from the service-issuing terminal 11 and performs the issuance of a service. The file system 22 is a file system for managing data stored in a memory of the IC chip. In order to receive the issuance of the service, the IC card 2 is placed over the reader/writer 11A of the service-issuing terminal 11.

When the IC card 2 is placed over the reader/writer 11A, in process P1, the service-issuing terminal 11 queries the service definition database 12 as to a command parameter to be added to a service-issuing command that is to be issued to the IC card 2, as shown in FIG. 1.

When receiving the query from the service-issuing terminal 11, in process P2, the service definition database 12 sends, as a response, a command parameter for designating a data structure corresponding to the type of service to be issued, a method for accessing user data, and the like.

When receiving the response from the service definition database 12, in process P3, the service-issuing terminal 11 transmits, to the IC card 2, a service-issuing command including information, added thereto as a command parameter, obtained by the query to the service definition database 12. The transmission of the service-issuing command and the command parameter is performed through the reader/writer 11A.

When receiving the service-issuing command and the command parameter transmitted from the service-issuing terminal 11, the service-issuing function 21 of the IC card 2 interprets the service-issuing command and, in process P4, performs IC-card internal processing. By the IC-card internal processing performed here, service definition information 22A is generated on the basis of the command parameter transmitted, together with the service-issuing command, from the service-issuing terminal 11. The service-issuing function 21 performs mapping of the service data structure in the file system 22 in accordance with the service definition information 22A. Accordingly, the service-issuing function 21 performs the issuance of the service.

When the issuance of the service has been completed, in process P5, the service-issuing function 21 transmits, to the service-issuing terminal 11, information indicating that the issuance of the service has been completed.

The conventional issuance of a service has been performed as described above. In the generation of service definition information for defining a desired service data structure, in some cases, the generation of such service definition information cannot be achieved by only a single exchange operation in processes P3 and P5. In these cases, the exchange operation in processes P3 and P5 is repeated a plurality of times.

FIG. 2 is a flowchart for explaining a conventional process performed between the reader/writer and the IC card 2 at the time of the operation of an application in accordance with a payment sequence. As processing sequences that define a process performed between the reader/writer and the IC card 2 at the time of the operation of an application, a charge sequence for increasing the balance of electronic money, a PIN sequence for performing authentication by using a PIN (Personal Identification Number), and the like, as well as the payment sequence, are available.

The process of FIG. 2 is performed when the IC card 2 that has received the issuance of a service as shown in FIG. 1 is placed over the reader/writer of a terminal that is provided so as to be used by a user when the user receives the provision of an application.

In step S1, the reader/writer performs, by transmitting a Polling command, search for and acquisition of the IC card 2 with which the reader/writer is to communicate.

In step S21, the IC card 2 receives the Polling command transmitted from the reader/writer. The IC card 2 proceeds to step S22 to respond to the Polling command.

When the response from the IC card 2 is transmitted, the reader/writer receives the response in step S2. The reader/writer proceeds to step S3 to perform, by transmitting a mutual authentication command, mutual authentication between the reader/writer and the IC card 2.

In step S23, the IC card 2 receives the mutual authentication command transmitted from the reader/writer. The IC card 2 proceeds to step S24 to read specific information to be used for mutual authentication from a memory and transmit the read information to the reader/writer.

When the information to be used for mutual authentication is transmitted from the IC card 2, the reader/writer receives the information in step S4.

In step S5, the reader/writer checks whether or not the amount of money to be paid meets a payment execution condition. In a case where the reader/writer confirms that the amount of money to be paid meets the payment execution condition, the reader/writer proceeds to step S6. For example, the upper limit of the amount of payment may be set as a payment execution condition. In this case, only the amount of money not exceeding the upper limit amount of money can be paid.

In step S6, in order to check whether or not the current time falls within the period of validity of the service, the reader/writer transmits, to the IC card 2, a Read command (a command for reading) including an identifier, added thereto as a command parameter, representing the position in which information indicating the period of validity of the service is stored.

The period of validity can be set for a service issued to the IC card 2. The period of validity of a service is represented using information on part of a service data structure defined by service definition information. At the time of the issuance of a service, the position in a memory where each piece of information constituting a service data structure is stored is defined by service definition information. A storage position of each piece of information to be read is identified by an identifier transmitted as a command parameter of a Read command from the reader/writer.

In step S25, the IC card 2 receives the Read command transmitted from the reader/writer, and reads the information indicating the period of validity of the service from its storage position identified by the identifier transmitted as a command parameter of the Read command. The IC card 2 proceeds to step S26 to transmit, to the reader/writer, the read information indicating the period of validity of the service.

When the information indicating the period of validity is transmitted from the IC card 2, the reader/writer receives the information in step S7.

In step S8, the reader/writer checks, on the basis of the information transmitted from the IC card 2, whether or not the current time falls within the time period of validity of the service. In a case where the reader/writer confirms that the current time falls within the period of validity, the reader/writer proceeds to step S9.

In step S9, in order to check the balance of electronic money stored in the IC card 2, the reader/writer transmits, to the IC card 2, the Read command including an identifier, added thereto as a command parameter, representing the position in which information indicating the balance is stored.

In step S27, the IC card 2 receives the Read command transmitted from the reader/writer, and reads the information indicating the balance of electronic money from its storage position identified by the identifier transmitted as a command parameter of the Read command. The IC card 2 proceeds to step S28 to transmit the read information indicating the balance to the reader/writer.

When the information indicating the balance of electronic money is transmitted from the IC card 2, the reader/writer receives the information in step S10.

In step S11, the reader/writer checks whether or not the balance of electronic money stored in the IC card 2 exceeds the amount of payment. In a case where the reader/writer confirms that the balance exceeds the amount of payment, the reader/writer proceeds to step S12.

In step S12, the reader/writer transmits, to the IC card 2, a Write command (a command for writing) including identifiers, added thereto as command parameters, representing the amount of payment and the position in which the balance is stored.

In step S29, the IC card 2 receives the Write command transmitted from the reader/writer. The IC card 2 proceeds to step S30 to perform a payment transaction. In the payment transaction, the current balance of electronic money, the storage position of which is identified by the identifier transmitted as a command parameter of the Write command, is overwritten with the amount of money that is obtained by subtracting the amount of payment from the previous balance.

When the overwriting of the balance has been successfully performed, in step S31, the IC card 2 transmits, to the reader/ writer, a success response, which is information indicating that the payment transaction has been successfully performed.

When the success response is transmitted from the IC card 2, the reader/writer receives the success response in step S13.

In step S14, the reader/writer transmits, to the IC card 2, the Write command including identifiers, added thereto as command parameters, representing the value of an access log and the position in which the access log is stored.

In step S32, the IC card 2 receives the Write command transmitted from the reader/writer. The IC card 2 proceeds to step S33 to perform access-log writing processing. In the access-log writing processing, the value of the access log is written at the storage position identified by the identifier transmitted as a command parameter of the Write command.

When the writing of the value of the access log has been successfully performed, in step S34, the IC card 2 transmits, to the reader/writer, a success response, which is information indicating that access-log writing processing has been successfully performed.

When the success response is transmitted from the IC card 2, the reader/writer receives the success response in step S15. Accordingly, a series of processing operations based on the payment sequence is completed.

As described above with reference to FIG. 1, the issuance of a service may be performed by using a plurality of commands. In addition, as described above with reference to FIG. 2, the process based on one processing sequence for realizing an application is performed by using a plurality of commands that are defined in units of functions of an IC card.

In Patent Document 1, a technology for performing cooperative processing between card applications on the basis of a cooperative coupon in which the processing details of cooperative processing between a plurality of card applications and conditions under which the cooperative processing should be performed are described is disclosed. In Patent Document 2, an electronic key system in which a mobile terminal and a contactless IC card are combined is disclosed.
Patent Document 1: Japanese Unexamined Patent Application Publication No. 2005-316992
Patent Document 2: Japanese Unexamined Patent Application Publication No. 2005-285056

DISCLOSURE OF INVENTION

Technical Problem

As described above, in order to operate applications for a conventional IC card, individual application servers need to devise a method for storing user data in a file system at the time of the issuance of a service (a data structure) and a processing sequence for accessing the user data at the time of the operation and to design the operation system.

Specifically, for each application server, the data structure of a service, such as in which position in a file system information indicating the period of validity of a service is stored and in which position information indicating the balance of electronic money is stored, must be defined. In addition, in order to realize a payment transaction, for each application server, the flow of a series of payment operations, such as at which timing the period of validity of the service is to be checked and at which timing the balance is to be checked, must be designed.

Thus, since user data is managed in accordance with service data structures that have been independently defined by individual application servers, a stabilized system can be provided in accordance with a service data structure defined by a certain application server, whereas a stabilized system cannot be provided in accordance with a service data structure defined by a different application server. As described above, it has been difficult to ensure the security and quality of a system in a uniform manner throughout a plurality of application servers.

In addition, in the payment sequence described above with reference to FIG. 2, the operation has been performed in which after the balance is once read from the IC card and the reader/writer side determines that the balance exceeds the amount of money to be paid, which is to be reduced from the balance, a Write command for reduction is transmitted. Thus, it has been necessary for the reader/writer to issue a plurality of commands to the IC card.

In addition, in reading of data from an IC card in accordance with a conventional command for a FeliCa OS, since data that can be read by a single reading operation is defined as data having a fixed length, in a case where, for example, information indicating the balance is information having a data amount less than that corresponding to the fixed length, it is impossible to read only the information indicating the balance. Thus, unnecessary information (data for cash back, an execution ID for management of transactions, or the like) contained in the same data block as a data block containing the information indicating the balance is also read at the same time.

In particular, since wireless communications are performed between the IC card and the reader/writer and the instability and spreading property (leakage property) of transmission is high compared with wired communications, there is a demand to reduce the number of data transmissions as much as possible and to transmit only the necessary minimum amount of data.

In the conventional FeliCa OS, an authorization key can be assigned to a data block having a fixed length and the access right can be set. However, the access right cannot be set for each piece of information to be used for a corresponding processing operation defined by a processing sequence, such as only information indicating the balance or information indicating the period of validity. In addition, for a certain data item, for example, the access right cannot be set for each of divided use states, such as the right to increase the amount of money and the right to decrease the amount of money.

The present invention has been designed in view of the above-described circumstances. The present invention allows a provision server of an application to be capable of easily causing an electronic apparatus having an IC chip to manage data.

Technical Solution

An electronic apparatus according to an aspect of the present invention having an IC chip that performs processing operations in accordance with transmission of a command includes storing means for storing, in association with an application provided by a provision server, programs describing plurality of types of processing sequences and information indicating a structure of data to be read and written by individual processing operations performed in accordance with the processing sequences; and managing means for acquiring, from the storing means, the programs and the information indicating the structure of the data that are stored in association with the application, which is identified by an identifier added to the command, which is transmitted from an external terminal, and for managing data to be read and written by the processing operations according to the processing sequences described in the acquired programs as data having the structure represented by the information acquired from the storing means.

Control means for performing the processing operations according to the processing sequences described in the programs acquired from the storing means and controlling reading and writing of the data whose structure is represented by the information acquired from the storing means, in accordance with transmission of the command, which is from a reader/writer provided so as to be used when a user receives provision of a specific application, can be further provided.

The managing means can be caused to set different authorization keys corresponding to the processing sequences described in the individual programs acquired from the storing means. In a case where a processing operation according to a specific processing sequence is performed in accordance with the transmission of the command from the reader/writer, before performing the processing operation, the control means can be caused to perform mutual authentication between the electronic apparatus and the reader/writer by using an authorization key set for the specific processing sequence.

The managing means can be caused to set different authorization keys corresponding to individual data items having different contents, the data items constituting the data to be read and written. In a case where a processing operation according to a specific processing sequence is performed in accordance with the transmission of the command from the reader/writer, before performing the processing operation, the control means can be caused to perform mutual authentication between the electronic apparatus and the reader/writer by using the authorization keys set for the data to be read and written by the processing operation according to the specific processing sequence.

An information processing method or program according to an aspect of the present invention includes the steps of acquiring, from storing means, programs and information indicating a structure of data that are stored in association with an application identified by an identifier added to a command transmitted from an external terminal; and managing data to be read and written by processing operations according to processing sequences described in the acquired programs as data having the structure represented by the information acquired from the storing means.

In an aspect of the present invention, programs and information indicating a structure of data that are stored in association with an application identified by an identifier added to a command transmitted from an external terminal are acquired from storing means, and data to be read and written by processing operations according to processing sequences described in the acquired programs is managed as data having the structure represented by the information acquired from the storing means.

Advantageous Effects

According to an aspect of the present invention, a provision server of an application is able to easily cause an electronic apparatus having an IC chip to manage data.

BRIEF DESCRIPTION OF DRAWINGS

FIG. 1 is an illustration for explaining a conventional service-issuing method.

FIG. 2 is a flowchart for explaining a conventional process performed between an IC card and a reader/writer.

FIG. 3 is an illustration for explaining a method for issuing a service in an information processing system according to an embodiment of the present invention.

FIG. 4 is an illustration showing an example of information indicating a data structure for each application.

FIG. 5 is a flowchart for explaining a process performed at the time of the issuance of a service.

EXPLANATION OF REFERENCE NUMERALS

Figure 6:
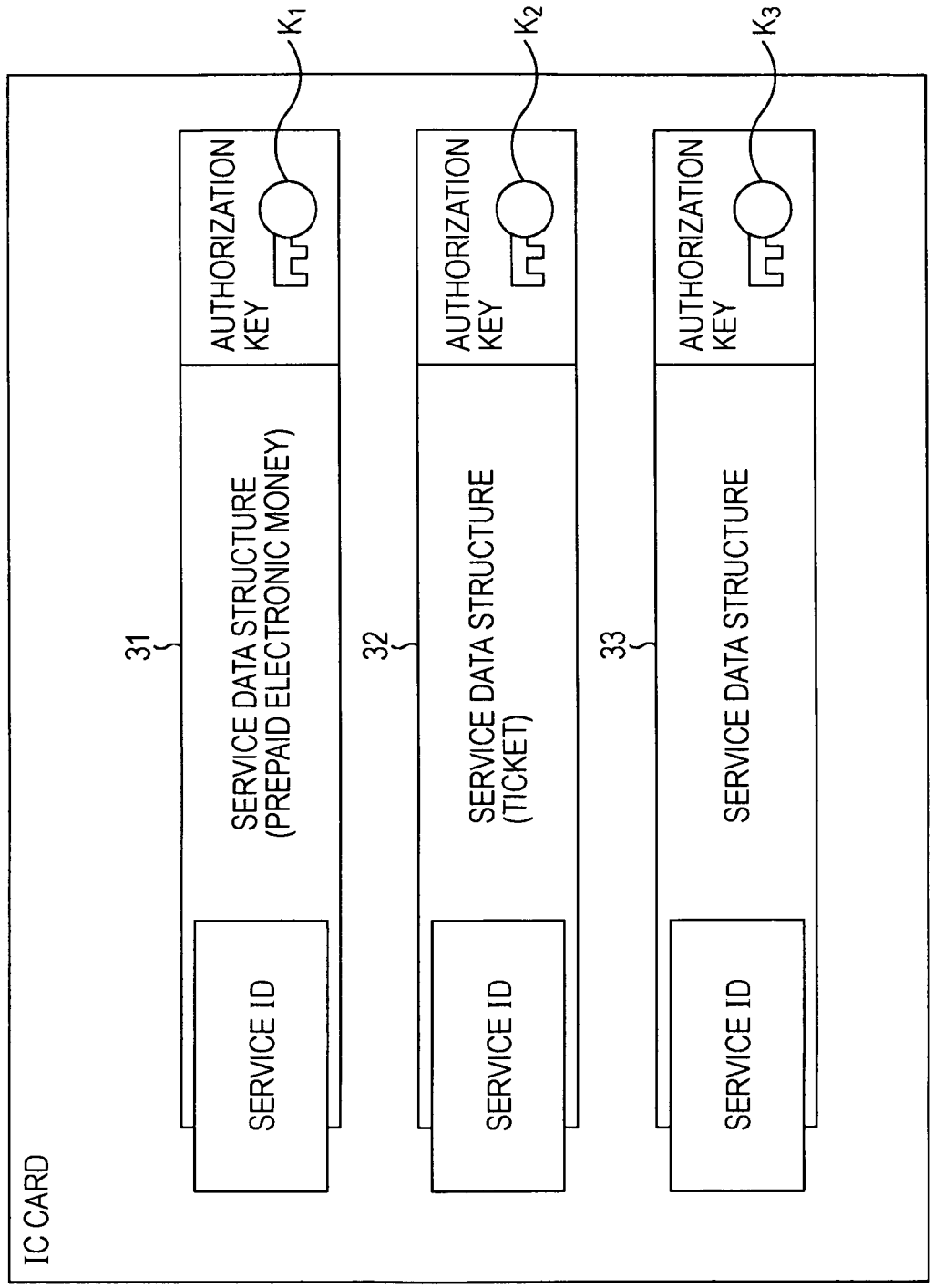
FIG. 6 is an illustration showing an example of service data structures.

1: service-issuing system, 2: IC card, 11: service-issuing terminal, 21: service-issuing function, 22: file system, 23: service definition database, 41: reader/writer, 51: prepaid electronic money object, 52: ticket object, 53: service object

BEST MODES FOR CARRYING OUT THE INVENTION

Hereinafter, embodiments of the present invention will be described with reference to the drawings.

FIG. 3 is an illustration for explaining a method for issuing a service in an information processing system according to an embodiment of the present invention. The same components as in FIG. 1 are denoted by the same reference numerals.

As shown in FIG. 3, the issuance of a service is performed by a service-issuing system 1. The service-issuing system 1 is a system that is provided by an application server and is constituted by a service-issuing terminal 11. A reader/writer 11A is provided at a predetermined position of the housing of the service-issuing terminal 11. The service-issuing system 1 may be constituted by a single apparatus or may be constituted by a plurality of apparatuses.

An IC card 2 is a contactless IC card owned by a user who wishes to receive the provision of a specific application. A service-issuing function 21 and a file system 22 are implemented in the IC card 2. In addition to them, a service definition database 23 is provided in the IC card 2. That is, the service definition database provided as a component on the service-issuing system 1-side in the example of FIG. 1 is provided in the example of FIG. 3 in such a manner that the service definition database is contained as a component on the IC card 2-side.

The service-issuing function 21 is a function that is implemented when a specific program is executed by an IC chip built in the IC card 2. The service-issuing function 21 interprets a service-issuing command transmitted from the service-issuing terminal 11 and performs the issuance of a service. The file system 22 is a file system that manages data stored in a memory of the IC chip. In order to receive the issuance of a service, the IC card 2 is placed over the reader/writer 11A of the service-issuing terminal 11.

When the IC card 2 is placed over the reader/writer 11A, in process P11, the service-issuing terminal 11 transmits a service-issuing command to the service-issuing function 21 implemented inside the IC card 2, as shown in FIG. 3. An identifier indicating the type of application, such as a prepaid electronic money application or a ticket application, the provision of which a user of the IC card 2 wishes to receive, is added as a command parameter to the service-issuing command transmitted from the service-issuing terminal 11.

When receiving the service-issuing command and the command parameter transmitted from the service-issuing terminal 11, the service-issuing function 21 of the IC card 2 interprets the service-issuing command and, in process P12, queries the service definition database 23 as to information indicating a service data structure and a program describing a processing sequence, which correspond to the identifier transmitted as a command parameter. Information indicating the data structure of a service and a program describing a processing sequence that are necessary for each application are stored, in association with an identifier of the application, in the service definition database 23.

For example, information indicating a service data structure that is signified by segments, such as a service ID, which is a contract number of an application, constraint conditions, such as the period, the section, the place, and the number of times in which the provision of the application can be received, a service value, such as the balance of electronic money used in a prepaid electronic money application, a payment execution condition, which is a condition under which the right is to be exercised, and an access log, is stored in the service definition database 23.

In addition, as a program describing a processing sequence, a program describing an individual processing sequence, such as a service use sequence, a charge sequence, a unit-of-payment writing sequence, a payment sequence, a constraint-on-payment checking sequence, a unit-of-payment checking sequence, a balance checking sequence, a history inquiry sequence, a PIN sequence, or a set value changing sequence, is stored in the service definition database 23. By execution of an individual program, a series of processing operations formed by a combination of reading of one or a plurality of pieces of data, writing of data, calculation using data, comparison of data, storing of processing history, checking of the validity of processing, and writing of electronic signature is performed, in accordance with a purpose, in the IC card 2.

When receiving the query from the service-issuing function 21, in process P13, the service definition database 23 sends, as a response, to the service-issuing function 21, the information indicating the service data structure and the program describing the processing sequence on which the query has been made.

When receiving the response from the service definition database 23, in process P14, the service-issuing function 21 performs IC-card internal processing. By the IC-card internal processing performed here, service definition information 22A is generated on the basis of the information indicating the service data structure and the program describing the processing sequence that have been transmitted from the service definition database 23. The service-issuing function 21 performs mapping of the service data structure in the file system 22 in accordance with the service definition information 22A. Accordingly, the service-issuing function 21 performs the issuance of a service.

When the issuance of the service has been completed, in process P15, the service-issuing function 21 transmits, to the service-issuing terminal 11, information indicating that the issuance of the service has been completed. The issuance of the service is performed as described above.

FIG. 4 is an illustration showing an example of information indicating a data structure for each application, the data structure being stored in the service definition database 23.

In the example of FIG. 4, types of applications are shown in the horizontal direction and service definition items are shown in the vertical direction. When the type of application is determined, the presence or absence of each of the service definition items is determined, and in a case where a service definition item is set to "presence", a specific definition is determined. The indication "selectable" represents that an application server is able to select, in a desired manner, the presence or absence of a corresponding service definition item (the presence or absence of a function using the service definition item).

For example, for a prepaid electronic money application shown in FIG. 4, "service value", which is a service definition item, is set to "balance", "constraint on service value" is set to "0 or more and upper limit", "payment sequence" is set to "subtraction", "payment execution condition" is set to "upper limit", "charge sequence" is set to "presence", "unit-of-payment writing sequence" is set to "absence", "the number of units of payment that can be stored" is set to "1", "constraint on period" is set to "for service data structure", "recording of processing history" is set to "presence", and "PIN sequence" is set to "selectable".

The indication that "service value" is set to "balance" represents that information indicating the balance of electronic money is stored in a storage position assigned to "service value" of the entire service data structure necessary for the prepaid electronic money application. The indication that "constraint on service value" is set to "0 or more and upper limit" represents that information indicating the upper limit of the amount of money that can be recorded as a balance, which is 0 or more, is stored in a storage position assigned to "constraint on service value" of the entire service data structure. By combining information indicating the storage position where certain information is stored as described above, a service data structure necessary for the prepaid electronic money application is defined.

The indication that "payment sequence" is set to "subtraction" represents that subtraction from the balance is performed in the payment sequence of the prepaid electronic money application. The indication that "payment execution condition" is set to "upper limit" represents that information indicating the upper limit of the amount of money that can be paid in a single payment sequence is stored in a storage position assigned to "payment execution condition" of the entire service data structure.

The indication that "charge sequence" is set to "presence" represents that a charge sequence is included as a processing sequence that implements the prepaid electronic money application. The indication that "unit-of-payment writing sequence" is set to "absence" represents that a unit-of-payment writing sequence is not included as a processing sequence that implements the prepaid electronic money application.

The indication that "the number of units of payment that can be stored" is set to "1" represents that a unit of payment (reduction in the balance) can be performed in a payment sequence implementing the prepaid electronic money application. The indication that "constraint on period" is set to "for service data structure" represents that information indicating the period of validity of the service data structure is stored in a storage position assigned to "constraint on period" of the entire service data structure.

The indication that "recording of processing history" is set to "presence" represents that the history of processing (access log) is recorded after the processing is performed in accordance with a certain processing sequence that implements the prepaid electronic money application. The indication that "PIN sequence" is set to "selectable" represents that the application server is able to select a PIN sequence, which is authentication using a PIN, so as to be included as a processing sequence that implements the prepaid electronic money application.

When a query from the service-issuing function 21 is made by transmission of an identifier of the prepaid electronic money application, in the service definition database 23, a program describing the charge sequence, for which the service definition item is set to "presence", a program describing the PIN sequence, and the like are read and provided to the service-issuing function 21.

In addition, information indicating the details of information stored in individual storage positions, such as the indication that "service value" is set to "balance", the indication that "constraint on service value" is set to "0 or more and upper limit", and the indication that "payment execution condition" is set to "upper limit", is provided as information indicating a service data structure.

Similarly, for the ticket application shown in FIG. 4, "service value", which is a service definition item, is set to "the number of tickets", "constraint on service value" is set to "0 or more and upper limit", "payment sequence" is set to "subtraction", "payment execution condition" is set to "upper limit/lower limit/unit", "charge sequence" is set to "absence", "unit-of-payment writing sequence" is set to "presence", "the number of units of payment that can be stored" is set to "plural", "constraint on period" is set to "for a unit of payment", "recording of processing history" is set to "presence", and "PIN sequence" is set to "selectable".

The indication that "service value" is set to "the number of tickets" represents that information indicating the number of remaining electronic tickets is stored in a storage position assigned to "service value" of the entire service data structure of the ticket application. The indication that "constraint on service value" is set to "0 or more and upper limit" represents that information indicating the upper limit of the number of electronic tickets that can be recorded as the number of remaining tickets, which is 0 or more, is stored in a storage position assigned to "constraint on service value" of the entire service data structure. By combining information indicating the storage position where certain information is stored as described above, a service data structure necessary for the ticket application is defined.

The indication that "payment sequence" is set to "subtraction" represents that subtraction from the number of remaining electronic tickets is performed in a payment sequence of the ticket application. The indication that "payment execution condition" is set to "upper limit/lower limit/unit" represents that information indicating one of the upper limit, the lower limit, and a unit of the number of tickets that can be paid in a single payment sequence is written in a storage position assigned to "payment execution condition" of the entire service data structure.

The indication that "charge sequence" is set to "absence" represents that a charge sequence is not included as a processing sequence that implements the ticket application. The indication that "unit-of-payment writing sequence" is set to "presence" represents that a unit-of-payment writing sequence is included as a processing sequence that implements the ticket application and in a case where the number of units of payment, which will be described later, is plural, a payment sequence (subtraction from the number of remaining tickets) can be performed for the individual units of payment.

The indication that "the number of units of payment that can be stored" is set to "plural" represents that a plurality of units of payment can be stored in a service data structure necessary for the ticket application. The indication that "constraint on period" is set to "for a unit of payment" represents that information indicating the period of validity of a unit of payment is written in a storage position assigned to "constraint on period" of the entire service data structure.

The indication that "recording of processing history" is set to "presence" represents that the history of processing is recorded after the processing is performed in accordance with a certain processing sequence that implements the ticket application. The indication that "PIN sequence" is set to "selectable" represents that the application server is able to select a PIN sequence so as to be included as a processing sequence that implements the ticket application.

When a query from the service-issuing function 21 is made by transmission of an identifier of the charge application, in the service definition database 23, a program describing the unit-of-payment writing sequence, a program describing the PIN sequence, and the like are read and provided to the service-issuing function 21.

In addition, information indicating the details of information stored in individual storage positions, such as the indication that "service value" is set to "the number of tickets", the indication that "constraint on service value" is set to "0 or more and upper limit", and the indication that "payment execution condition" is set to "upper limit/lower limit/unit", is provided as information indicating a service data structure.

Similarly, when an identifier of another application is transmitted from the service-issuing function 21, a program describing a processing sequence for which the service definition item shown in FIG. 4 is set to "presence" and information indicating a service data structure are read from the service definition database 23 and are provided to the service-issuing function 21.

As described above, in the information processing system shown in FIG. 3, information necessary for an application identified by an identifier transmitted from the service-issuing system 1 is read from the service definition database 23, and the issuance of a service is performed within the IC card 2.

Since the service definition database 23 in which information necessary for the issuance of a service is provided in the IC card 2, on the occasion of the issuance (activation) of a service by writing of information necessary for an application into the IC card 2, there is no need to transmit information necessary for the issuance of the service from the service-issuing system 1-side to the IC card 2-side. Thus, the amount of data transmitted and received between the service-issuing system 1 and the IC card 2 on the occasion of the issuance of the service can be reduced to a minimum amount of data, and the number of times data transmission and reception is performed can also be reduced.

In addition, since information transmitted from the service-issuing system 1-side to the IC card 2-side on the occasion of the issuance of the service is only a service-issuing command including an identifier, added thereto as a command parameter, of the application, an application server does not have to independently perform design processing regarding which program that describes a processing sequence is to be transmitted or which information that indicates a service data structure is to be transmitted, and there is no need to prepare such design processing in the service-issuing system 1. Thus, the cost required for such preparation can be reduced.

Here, a process performed between the reader/writer 11A and the IC card 2 at the time of the issuance of a service will be described with reference to a flowchart of FIG. 5.

When the IC card 2 is placed over the reader/writer 11A, in step S41, the reader/writer 11A transmits, to the IC card 2, a service-issuing command including an identifier, added thereto as a command parameter, representing the type of application.

In step S51, the service-issuing function 21 of the IC card 2 receives the service-issuing command transmitted from the reader/writer 11A. The service-issuing function 21 proceeds to step S52.

In step S52, by interpreting the service-issuing command, the service-issuing function 21 queries the service definition database 23 as to information indicating a service data structure and a program describing a processing sequence that correspond to the identifier transmitted as a command parameter.

In step S53, the service definition database 23 transmits, as a response to the query from the service-issuing function 21, the information indicating the service data structure and the program describing the processing sequence, on which the query has been made, to the service-issuing function 21.

In step S54, the service-issuing function 21 generates the service definition information 22A on the basis of the information indicating the service data structure and the program describing the processing sequence transmitted from the service definition database 23, and performs the issuance of the service by performing mapping of the service data structure in the file system 22 in accordance with the generated service definition information 22A.

In step S55, the service-issuing function 21 transmits, to the reader/writer 11A, information indicating that the issuance of the service has been completed.

The information transmitted from the service-issuing function 21 is received by the reader/writer 11A in step S42, and the process is completed.

FIG. 6 is an illustration showing an example of service data structures mapped in the file system 22 of the IC card 2.

By repeating the process shown in FIG. 5, service data structures necessary for receiving the provision of a plurality of applications are individually mapped in the file system 22 of the IC card 2. In the example of FIG. 6, three service data structures, service data structures 31 to 33, are shown.

The service data structure 31 in FIG. 6 is a service data structure that is necessary for receiving the provision of a prepaid electronic money (stored-value-type electronic money) application, and the service data structure 32 is a service data structure that is necessary for receiving the provision of a ticket application. The service data structure 33 is a service data structure that is necessary for receiving the provision of a specific application. Service IDs, as identifiers, are set for the individual service data structures 31 to 33.

In addition, in the example of FIG. 6, an authorization key $K_1$ is set for the service data structure 31, and an authorization key $K_2$ is set for the service data structure 32. In addition, an authorization key $K_3$ is set for the service data structure 33. Thus, for example, a key corresponding to the authorization key $K_1$ must be provided for a reader/writer (a terminal in which a reader/writer is provided) to be used for the operation of the prepaid electronic money application, and a key corresponding to the authorization key $K_2$ must be provided for a reader/writer to be used for the operation of the ticket application.

When the user holds the IC card 2 over a reader/writer in order to receive the provision of a prepaid electronic money application, a key corresponding to the authorization key $K_2$ is used in the reader/writer and the authorization key $K_2$ is used in the IC card 2, so that mutual authentication by so-called challenge and response is performed between the reader/writer and the IC card 2. When mutual authentication has been successfully performed, access to data (reading and writing of data) managed by the service data structure 31 can be performed.

As described above, in the IC card 2, an authorization key can be set for each service data structure. Note that although the three types of service data structures are shown in the example of FIG. 6, the number of types of service data structures can be set in a desired manner. In addition, determination of whether or not an authorization key is to be set can be made in a desired manner.

Next, the operation of an application with respect to the IC card 2 to which a service has been issued as described above will be described.

Figure 7:
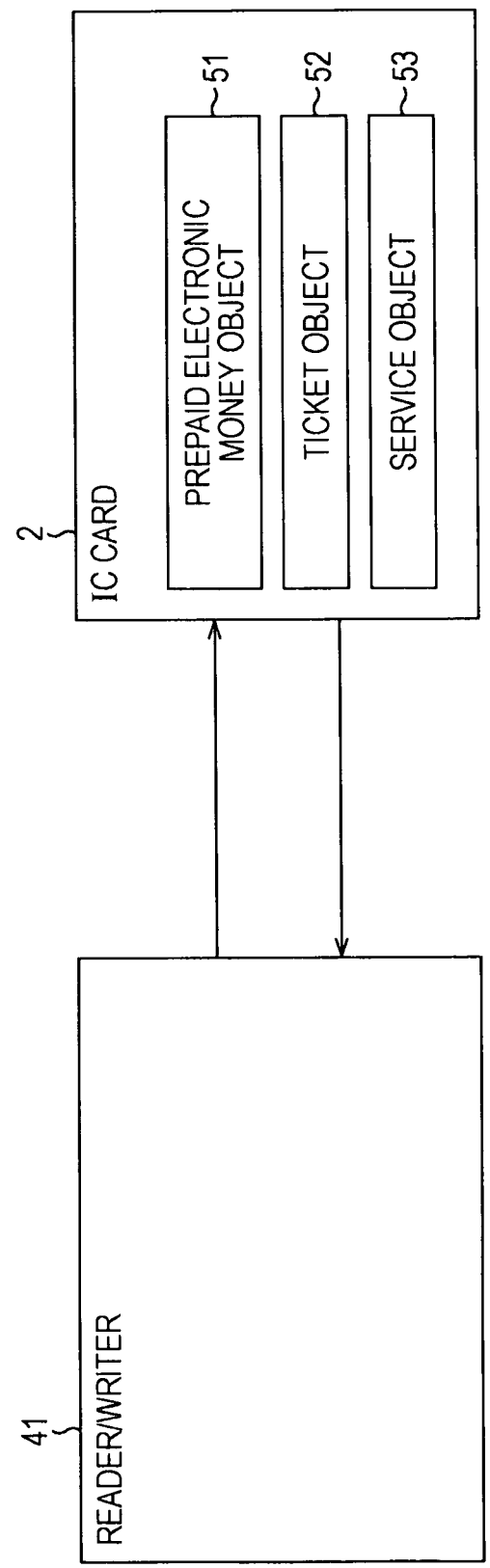
FIG. 7 is an illustration showing an example of a basic system configuration at the time of the operation of an application.

FIG. 7 is an illustration showing the IC card 2 and a reader/writer 41 that constitute a basic system configuration at the time of the operation of an application.

In the example of FIG. 7, a prepaid electronic money object 51, a ticket object 52, and a service object 53 are implemented in the IC card 2. The prepaid electronic money object 51 controls processing defined by a processing sequence described in a program read and acquired from the service definition database 23 at the time of the issuance of a prepaid electronic money application and writing and reading of data managed by the service data structure 31. The ticket object 52 controls processing defined by a processing sequence described in a program read and acquired from the service definition database 23 at the time of the issuance of a ticket application and writing and reading of data managed by the service data structure 32. The service object 53 controls processing defined by a processing sequence described in a program read and acquired from the service definition database 23 at the time of the issuance of a specific application and writing and reading of data managed by the service data structure 33.

Each of the prepaid electronic money object 51, the ticket object 52, and the service object 53 interprets a command transmitted from the reader/writer 41 and performs processing in accordance with a specific processing sequence.

The reader/writer 41 is provided, for example, in a terminal to be used for the operation of a prepaid electronic money application. When the IC card 2 is placed over the reader/writer 41, the reader/writer 41 issues a specific command to the IC card 2, and causes various functions of the prepaid electronic money application to be implemented in the IC card 2. As functions of the prepaid electronic money applications, for example, addition of electronic money value, payment using electronic money stored in the IC card 2, checking of the balance of electronic money stored in the IC card 2, checking of the history of payment using electronic money stored in the IC card 2, user authentication using a PIN, changing of various values stored in the IC card 2, and the like are available.

Such various functions are not implemented by a plurality of command exchanges, for example, as described above with reference to FIG. 2. Such various functions can be performed by a single command exchange.

For example, in a case where payment using electronic money stored in the IC card 2 is performed, a payment command is transmitted from the reader/writer 41, and in accordance with this, processing is performed in accordance with a payment sequence by the prepaid electronic money object 51. Accordingly, the payment using electronic money is performed in the IC card 2. At the time of the issuance of a service necessary for a prepaid electronic money application, in the IC card 2, a program describing a series of processing operations of the payment sequence, such as checking of a payment execution condition, checking of the period of validity of a service, checking of the balance, and reduction in the balance, is read, as a program for implementing a payment function of the prepaid electronic money application, from the service definition database 23.

As described above, since a series of processing operations can be performed by using only a single command in the IC card 2, compared with a case where the same series of processing operations is performed by using a plurality of commands, the load to be imposed on an application server can be reduced. That is, even in the case of performing payment, an application server does not have to set out the timing of each processing operation, such as checking of a payment execution condition, checking of the period of validity of a service, checking of the balance, or reduction in the balance, and to define a command for causing each processing operation to be performed. Thus, it is only necessary to arrange only a payment command to be issued to the IC card 2. That is, the number of man hours of the system can be significantly reduced, and the cost can thus be reduced. In addition, the amount of data transmitted and received in communication transactions between the IC card 2 and the reader/writer can be reduced.

In addition, as described later, an application server is able to assign a corresponding authorization key to each of the processing sequences. Thus, authorization dissolved for each processing sequence can be set, and the risk of the security in a case where leakage of an authorization key occurs can be reduced. For example, in a case where authorization of all the processing sequences is managed by a single authorization key, if leakage of the single authorization key occurs, all the processing sequences may be abused. However, in a case where an authorization key can be assigned to each processing sequence and an operating side is able to use only a processing sequence for which authentication has been successfully performed by using the authorization key, even if leakage of an authorization key occurs, abuse of all the processing sequences as described above can be avoided.

Figure 8:
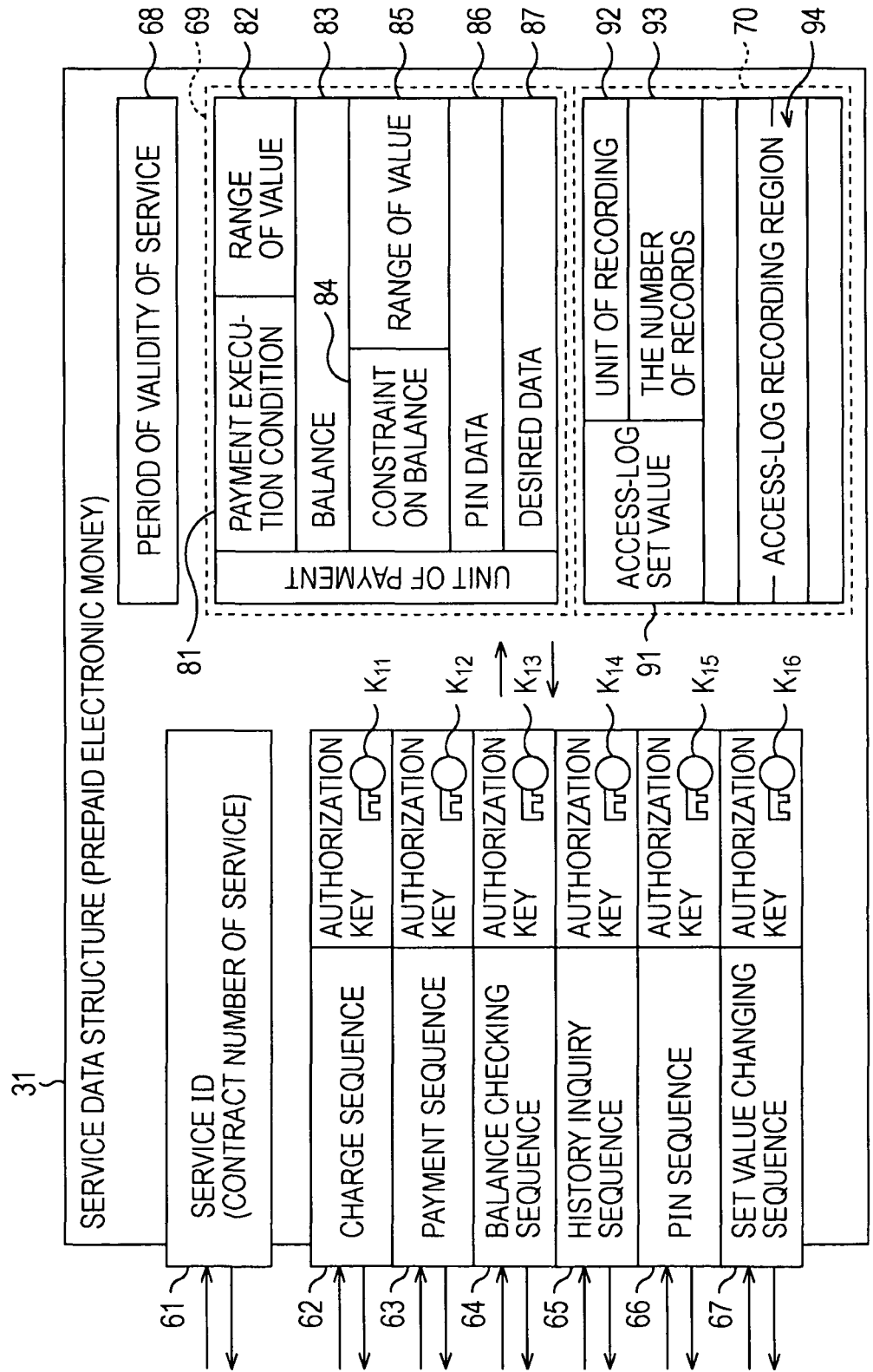
FIG. 8 is an illustration showing an example of a service data structure 31 in FIG. 6.

FIG. 8 is an illustration showing an example of the service data structure 31 in FIG. 6.

As shown in FIG. 8, the service data structure 31 is basically categorized into a service ID area 61, processing sequence areas 62 to 67, and data storage areas 68 to 70, which are areas in which specific data (user data) within the service data structure is stored.

The service ID area 61 is an area in which a value (information) corresponding to a number assigned, as a contract number of an application, to the user of the IC card 2 is stored. A unique value is adopted within an application of a single application server (in the example of FIG. 8, a prepaid electronic money application). Thus, the service data structure 31 is identified by a command issued by the reader/writer 41.

The processing sequence areas 62 to 67 are areas in which values identifying groups of processing steps that can be called from the reader/writer 41 (programs describing processing sequences) are stored. A processing sequence is defined as a processing function that collectively defines steps constituted by processing operations, such as reading of data stored in one or a plurality of areas of the data storage areas 68 to 70, writing of data, calculation using data, comparison of data, storing of processing history, checking of the validity of processing, and writing of electronic signature, and processing based on each processing function is performed by a command issued from the reader/writer 41.

In the example of FIG. 8, programs describing processing sequences, such as a charge sequence, a payment sequence, a balance checking sequence, a history inquiry sequence, a PIN sequence, and a set value changing sequence, are stored in the processing sequence areas 62 to 67, respectively.

The charge sequence defines processing steps for adding value in a balance region 83 constituting the data storage area 69. The payment sequence defines processing steps for reducing the balance (use of electronic money) represented by the value stored in the balance region 83.

The balance checking sequence defines processing steps for checking the balance represented by the value stored in the balance region 83. The history inquiry sequence defines processing steps for checking an access log represented by information stored in the data storage area 70.

The PIN sequence defines processing steps for providing access restriction using a PIN and processing steps for releasing access restriction for data managed by the service data structure 31. The set value changing sequence defines processing steps for changing a set value that can be changed at the time of operation among values stored in the data storage areas 68 to 70.

In addition, in the example of FIG. 8, authorization keys $K_{11}$ to $K_{16}$ are set for processing sequences described in programs stored in the processing sequence areas 62 to 67, respectively. It is assumed that in order to perform the processing sequences, mutual authentication using the individually set authorization keys $K_{11}$ to $K_{16}$ has been successfully performed.

The data storage area 68 is an area in which information indicating the period of validity of the entire service data structure 31 is stored.

The data storage area 69 is an area in which various types of information regarding a unit of payment are stored and is constituted by a payment execution condition region 81, a region 82, the balance region 83, a constraint-on-balance region 84, a region 85, a PIN data region 86, and a desired data region 87.

The payment execution condition region 81 is a region in which information indicating a constrained condition on the execution of payment is stored. As a condition on the payment, information indicating a range of the amount of payment, such as, for example, "a range of value (balance) reduced at the time of payment should be 1 or more yen and 20,000 or less yen", is stored in the region 82.

The balance region 83 is a region in which information indicating the balance of electronic money is stored. The constraint-on-balance region 84 is a region in which information indicating a constrained condition on the balance is stored. As a condition on the balance, information indicating a range of the balance, such as, for example, "the balance should be 0 or more yen and 50,000 or less yen", is stored in the region 85.

The PIN data region 86 is a region in which information on a PIN to be used on the occasion of PIN authentication is stored. The desired data region 87 is a region in which data that can be set in a desired manner by an application server is stored.

The data storage area 70 is an area in which information on an access log is stored. The data storage area 70 is constituted by an access-log set value region 91, a region 92, a region 93, and an access-log recording region 94.

The access-log set value region 91 is a region in which a set value regarding the access-log recording region 94 is stored. As a set value regarding the access-log recording region 94, information indicating a unit of recording of an access log, such as "an access log is recorded in a payment sequence" is stored in the region 92. In addition, as a set value regarding the access-log recording region 94, information indicating the number of records, such as "up to four access logs are stored" is stored in the region 93.

The access-log recording region 94 is a region in which access logs are recorded in a FIFO (First In First Out) method.

As described above, in the IC card 2, data is managed while a region is assigned for each content. Thus, only data that is necessary for processing can be read, without other unnecessary data being read. For example, in a case where data is managed while being divided into blocks having a fixed length and reading of data is performed for data stored in each block, if an amount of data that is less than that corresponding to the fixed length is read, unwanted data that is unnecessary for processing is read. However, reading of such unwanted data can be avoided.

Figure 9:
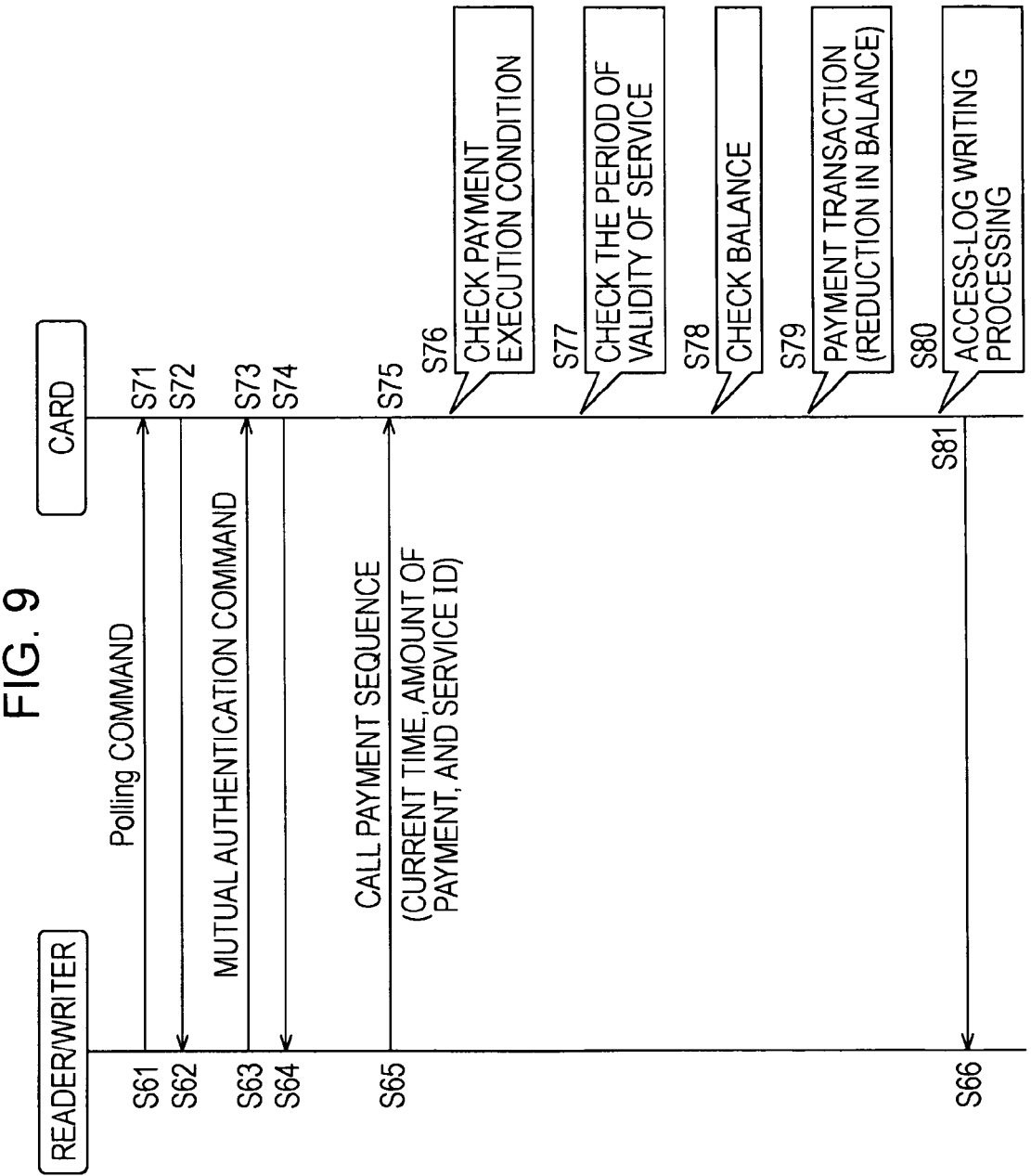
FIG. 9 is a flowchart for explaining a process performed between an IC card and a reader/writer.

Here, a process performed between the IC card 2 and the reader/writer 41 in accordance with a payment sequence will be described with reference to a flowchart of FIG. 9.

Processing of steps S61 to S64 performed by the reader/writer 41 and processing of steps S71 to S74 performed by the IC card 2 are similar to the processing of steps S1 to S4 and the processing of steps S21 to S24 of FIG. 2, respectively.

That is, in step S61, the reader/writer 41 performs, by transmitting a Polling command, search for and acquisition of the IC card 2 with which the reader/writer 41 is to communicate.

In step S71, the IC card 2 receives the Polling command transmitted from the reader/writer 41. The IC card 2 proceeds to step S72 to respond to the Polling command.

When the response from the IC card 2 is transmitted, the reader/writer 41 receives the response in step S62. The reader/writer 41 proceeds to step S63 to perform, by transmitting a mutual authentication command, mutual authentication between the reader/writer 41 and the IC card 2.

In step S73, the IC card 2 receives the mutual authentication command transmitted from the reader/writer 41. The IC card 2 proceeds to step S74 to read specific information to be used for authentication from a memory and transmit the read information to the reader/writer 41.

When the information to be used for mutual authentication is transmitted from the IC card 2, the reader/writer 41 receives the information in step S64.

In step S65, the reader/writer transmits a payment sequence call command to the IC card 2. Information indicating the current time, the amount of payment, and a service ID is added as command parameters to the payment sequence call command transmitted here.

In step S75, the prepaid electronic money object 51 of the IC card 2 receives the payment sequence call command transmitted from the reader/writer 41, and calls a payment sequence by executing a program stored in the processing sequence area 63 of the service data structure 31 identified by the service ID transmitted as a command parameter. The subsequent processing is performed in accordance with the called payment sequence.

In step S76, the prepaid electronic money object 51 checks a payment execution condition. For example, it is checked whether or not the amount of payment transmitted as a command parameter from the reader/writer 41 is an amount that falls within a range of the amount of payment represented by information stored in the region 82. In a case where it is confirmed that the amount of payment transmitted as a command parameter is an amount that falls within the range, the process proceeds to step S77.

In step S77, the prepaid electronic money object 51 checks the period of validity of the service data structure. For example, it is checked whether or not the current time transmitted as a command parameter from the reader/writer 41 is time that falls within the period of validity of the service data structure 31 represented by a value stored in the data storage area 68. In a case where it is confirmed that the current time is time that falls within the period of validity, the process proceeds to step S78.

In step S78, the prepaid electronic money object 51 checks the balance of electronic money. For example, after the balance represented by information stored in the balance region 83 is checked, the process proceeds to step S79.

In step S79, the prepaid electronic money object 51 performs a payment transaction. For example, the balance of electronic money represented by the information stored in the balance region 83 is overwritten with the amount obtained by subtracting the amount of payment from the current balance. Information representing the amount of payment is also transmitted as a command parameter from the reader/writer 41.

In step S80, the prepaid electronic money object 51 performs access-log writing processing. For example, a value representing a log of the current payment transaction is written in a specific area of the access-log recording region 94.

When writing of the value of the access log has been successfully performed, in step S81, the prepaid electronic money object 51 transmits, to the reader/writer 41, a success response, which is information indicating that the access-log writing processing has been successfully performed.

When the success response is transmitted from the IC card 2, in step S66, the reader/writer 41 receives the success response. Accordingly, a series of processing operations in accordance with the payment sequence is completed.

As described above, in the IC card 2, a processing sequence is called in accordance with transmission of a command from the reader/writer, and processing according to the processing sequence proceeds.

Figure 10:
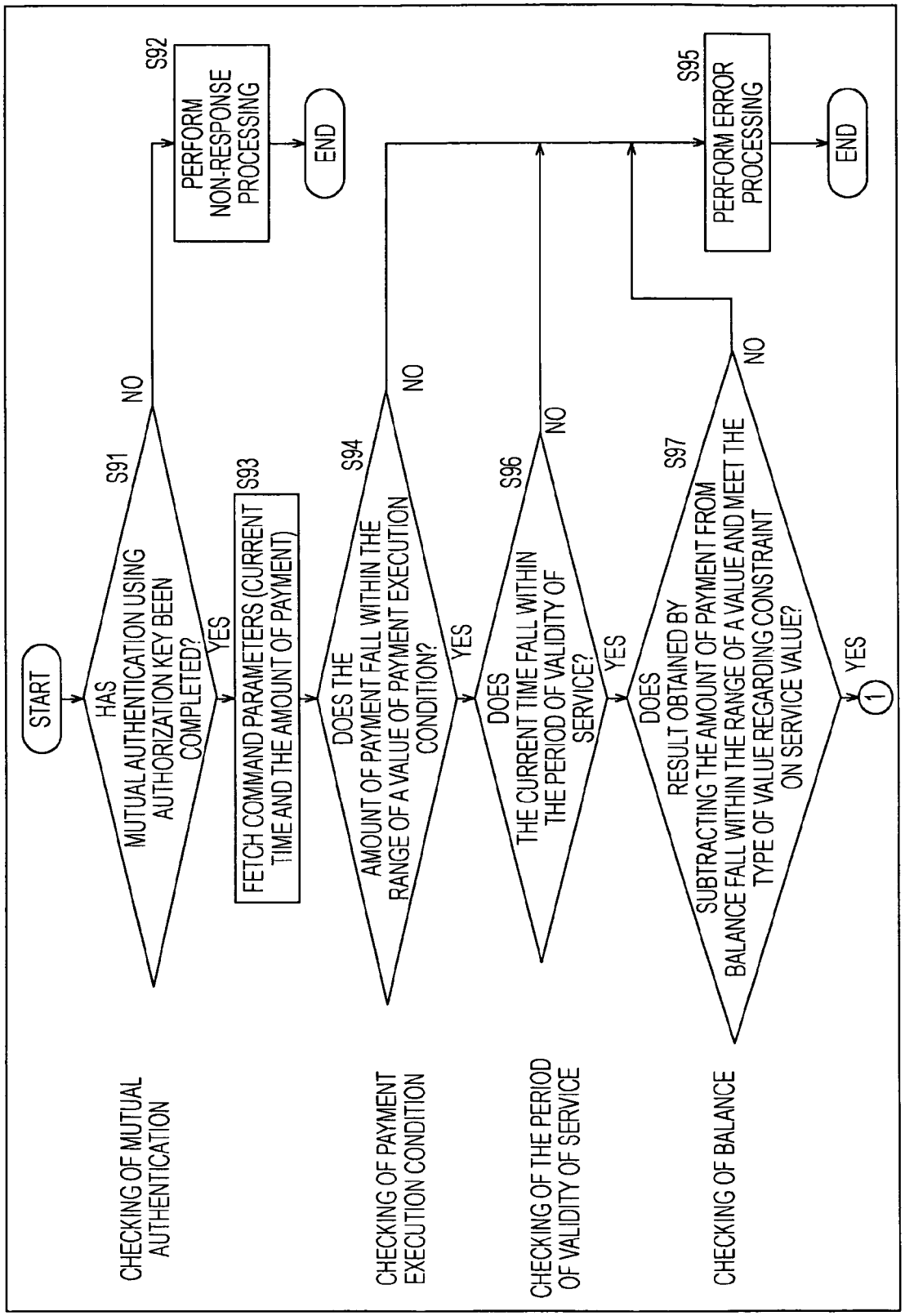
FIG. 10 is a flowchart for explaining a process of an IC card performed in accordance with a payment sequence.
Figure 11:
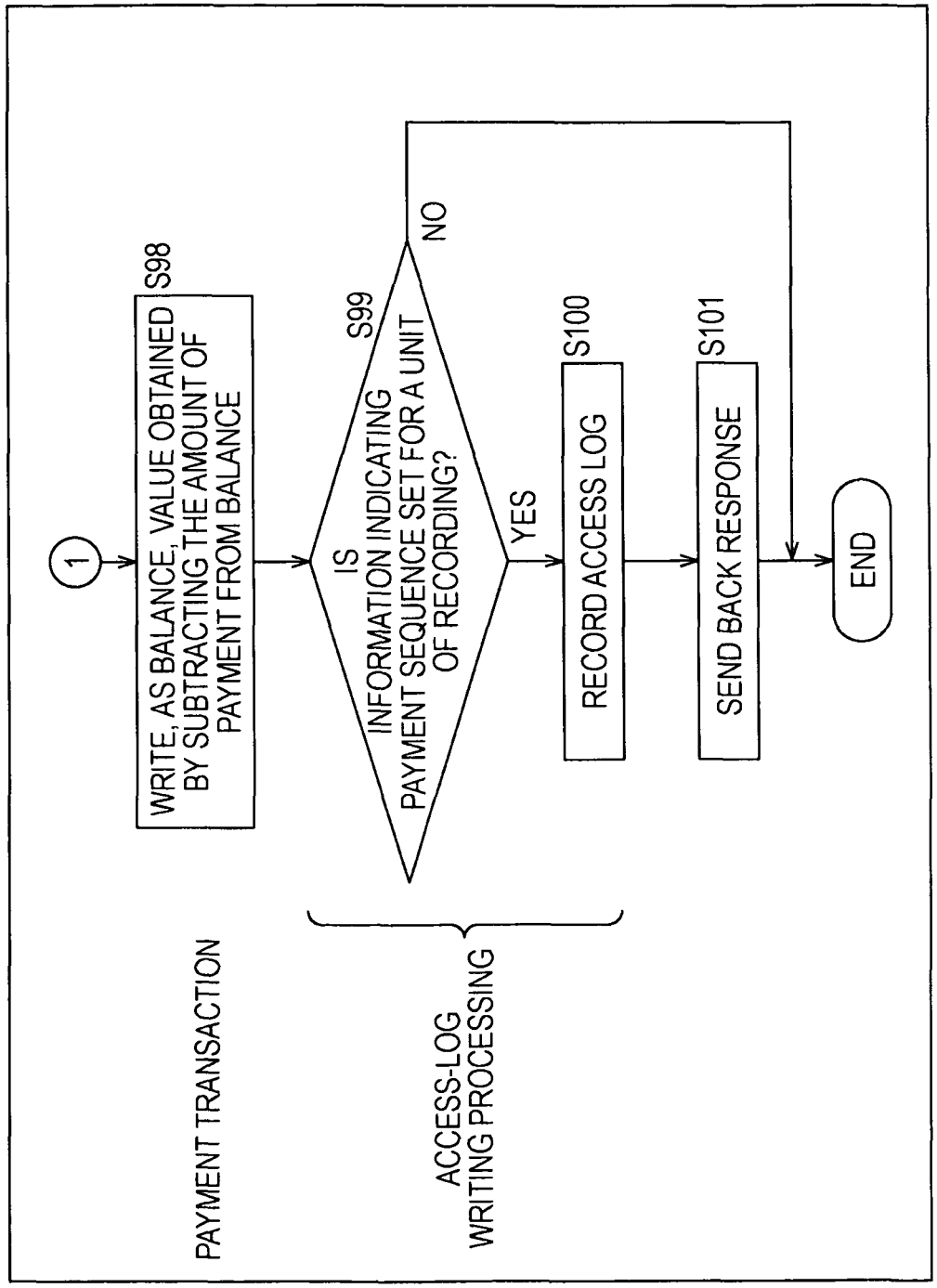
FIG. 11 is a flowchart, following the flowchart of FIG. 10, for explaining the process of the IC card performed in accordance with the payment sequence.

A series of processing operations of the IC card 2 performed in accordance with a payment sequence will be described in detail with reference to flowcharts of FIGS. 10 and 11.

The processing is started when the IC card 2 is held over the reader/writer 41 and a mutual authentication command is transmitted from the reader/writer 41. When a mutual authentication command is transmitted, mutual authentication by using the authorization key $K_1$ that is assigned to the service data structure 31 of the IC card 2 and an authorization key that is assigned to the reader/writer 41 as a key corresponding to the authorization key $K_1$ is performed between the IC card 2 and the reader/writer 41.

In step S91, the prepaid electronic money object 51 of the IC card 2 determines whether or not mutual authentication performed between the IC card 2 and the reader/writer 41 has been completed. In a case where it is determined that mutual authentication has not been completed due to failure in mutual authentication or the like, the prepaid electronic money object 51 proceeds to step S92.

In step S92, the prepaid electronic money object 51 performs non-response processing, and terminates the process.

Meanwhile, in a case where it is determined in step S91 that mutual authentication has been completed, the prepaid electronic money object 51 proceeds to step S93 to fetch a command parameter transmitted from the reader/writer 41 and added to the payment sequence call command. For example, information indicating the current time and the amount of payment is fetched.

In step S94, the prepaid electronic money object 51 determines whether or not the amount of payment transmitted as a command parameter from the reader/writer 41 meets a payment execution condition by determining whether or not the amount of payment is an amount that falls within a range of the amount of payment represented by information stored in the region 82.

In a case where it is determined in step S94 that the payment execution condition is not met, the prepaid electronic money object 51 proceeds to step S95 to perform error processing. Then, the prepaid electronic money object 51 terminates the process. For example, the fact that the payment execution condition is not met is reported to the reader/writer 41, and a message for notifying the user of the fact is displayed on the reader/writer 41.

Meanwhile, in a case where it is determined in step S94 that the payment execution condition is met, the prepaid electronic money object 51 proceeds to step S96 to determine whether or not the current time transmitted as a command parameter from the reader/writer 41 is time that falls within the period of validity of the service data structure 31 represented by a value stored in the data storage area 68.

In a case where it is determined in step S96 that the current time is not time that falls within the period of validity of the service data structure 31, the prepaid electronic money object 51 proceeds to step S95 to perform error processing. Then, the prepaid electronic money object 51 terminates the process. For example, the fact that the period of validity has expired is reported to the reader/writer 41, and a message for notifying the user of the fact is displayed on the reader/writer 41.

Meanwhile, in a case where it is determined in step S96 that the current time is time that falls within the period of validity of the service data structure 31, the prepaid electronic money object 51 proceeds to step S97 to check the balance represented by information stored in the balance region 83 and determine whether or not the amount obtained by subtracting the amount of payment from the balance is an amount that falls within the range of a constraint condition of the balance represented by information stored in the constraint-on-balance region 84 and whether or not the range of the value (amount) and the type of value as constraint conditions are met.

In a case where it is determined in step S97 that the amount obtained by subtracting the amount of payment from the balance does not fall within the range of the value and does not meet the type of value as the constraint conditions, the prepaid electronic money object 51 proceeds to step S95 to perform error processing. Then, the prepaid electronic money object 51 terminates the process. For example, the fact that the constraint conditions on the balance are not met is reported to the reader/writer 41, and a message for notifying the user of the fact is displayed on the reader/writer 41.

Meanwhile, in a case where it is determined in step S97 that the amount obtained by subtracting the amount of payment from the balance falls within the range of the value and meets the type of value as the constraint conditions, the prepaid electronic money object 51 proceeds to step S98 to perform payment by overwriting the balance of electronic money represented by information stored in the balance region 83 with the amount obtained by subtracting the amount of payment from the current balance.

In step S99, the prepaid electronic money object 51 determines whether or not a unit of recording of an access log is designated as a payment sequence, on the basis of information stored in the region 92. In a case where it is determined that such designation is not made, the prepaid electronic money object 51 terminates the process.

Meanwhile, in a case where it is determined in step S99 that a unit of recording of an access log is designated as a payment sequence, the prepaid electronic money object 51 proceeds to step S100 to record a value indicating the details of the current payment as an access log in the access-log recording region 94.

When the writing of the value of an access log has been successfully performed, in step S101, the prepaid electronic money object 51 transmits, to the reader/writer 41, a success response, which is information indicating that the access-log writing processing has been successfully performed. Then, the prepaid electronic money object 51 completes the process.

Since processing, such as checking of a payment execution condition, checking of the period of validity of a service, and calculation of the balance to be rewritten, which have been conventionally performed in the reader/writer 41-side, is performed in the IC card 2-side as described above, the number of times information is exchanged between the IC card 2 and the reader/writer 41 can be reduced to a minimum. In wireless communications, the spreading property (leakage property) of data is problematic, and there is a demand to suppress data transmission and reception as much as possible. In such circumstances, the superiority in this respect can be achieved.

In addition, since communication between the IC card 2 and the reader/writer 41 is performed in a wireless manner, a phenomenon in which the IC card 2 cannot receive a correct packet due to causes such as intrusion of noise into a communication transmission path may occur. In a case where such a phenomenon occurs, the reader/writer 41 needs to perform retry (retransmission request) processing for each command. However, the probability that such a phenomenon will occur can be reduced.

Furthermore, in a case where a series of processing operations such as a payment sequence is performed in the IC card 2 in accordance with a plurality of commands, in a situation, such as when the IC card 2 goes out of the range of access of a magnetic filed generated by the reader/writer 41 in the process of the series of processing operations and the power of the IC card 2 is cut off, it is necessary for the reader/writer 41 to perform recovery processing (rollback processing) from the state in the process of the processing at a predetermined timing, such as when the IC card 2 enters the range of access of the magnetic field next time. However, the probability that such a necessity will occur can also be reduced.

Figure 12:
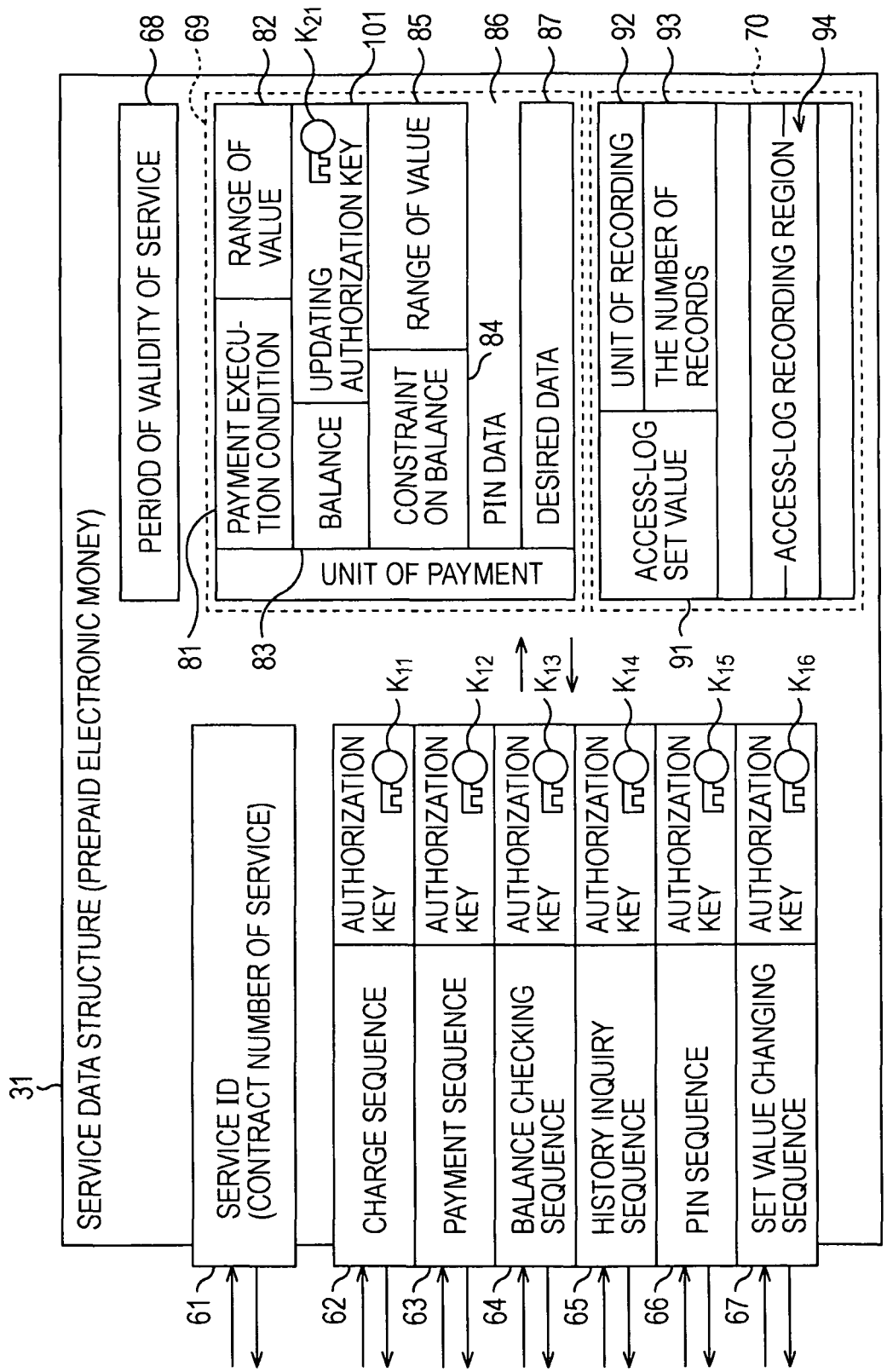
FIG. 12 is an illustration showing another example of the service data structure 31 in FIG. 6.

FIG. 12 is an illustration showing another example of the service data structure 31.

The service data structure 31 shown in FIG. 12 is the same as the service data structure 31 shown in FIG. 8 with the exception that an updating authorization key $K_{21}$ is set for information indicating the balance stored in the balance region 83 and the updating authorization key $K_{21}$ is stored in a region 101.

In a case where such a service data structure is set as a target, in a payment sequence and a charge sequence, which are sequences that involve updating of the balance, before updating of the balance is performed, mutual authentication using the updating authorization key $K_2$, and an authorization key assigned to the reader/writer 41 as a key corresponding to the updating authorization key $K_{21}$ is performed between the IC card 2 and the reader/writer 41. When mutual authentication has been successfully performed, information stored in the balance region 83 can be updated.

As described above, an authorization key can be set for data stored in a single region, as well as a service data structure or a processing sequence. In addition, an authorization key corresponding to a purpose, such as a key for reading data or a key for writing data, such as the updating authorization key $K_{21}$ in FIG. 12, can be set. Thus, by setting an authorization key for each region and each purpose, the risk of the security in a case where leakage of an authorization key occurs can be reduced.

Figure 13:
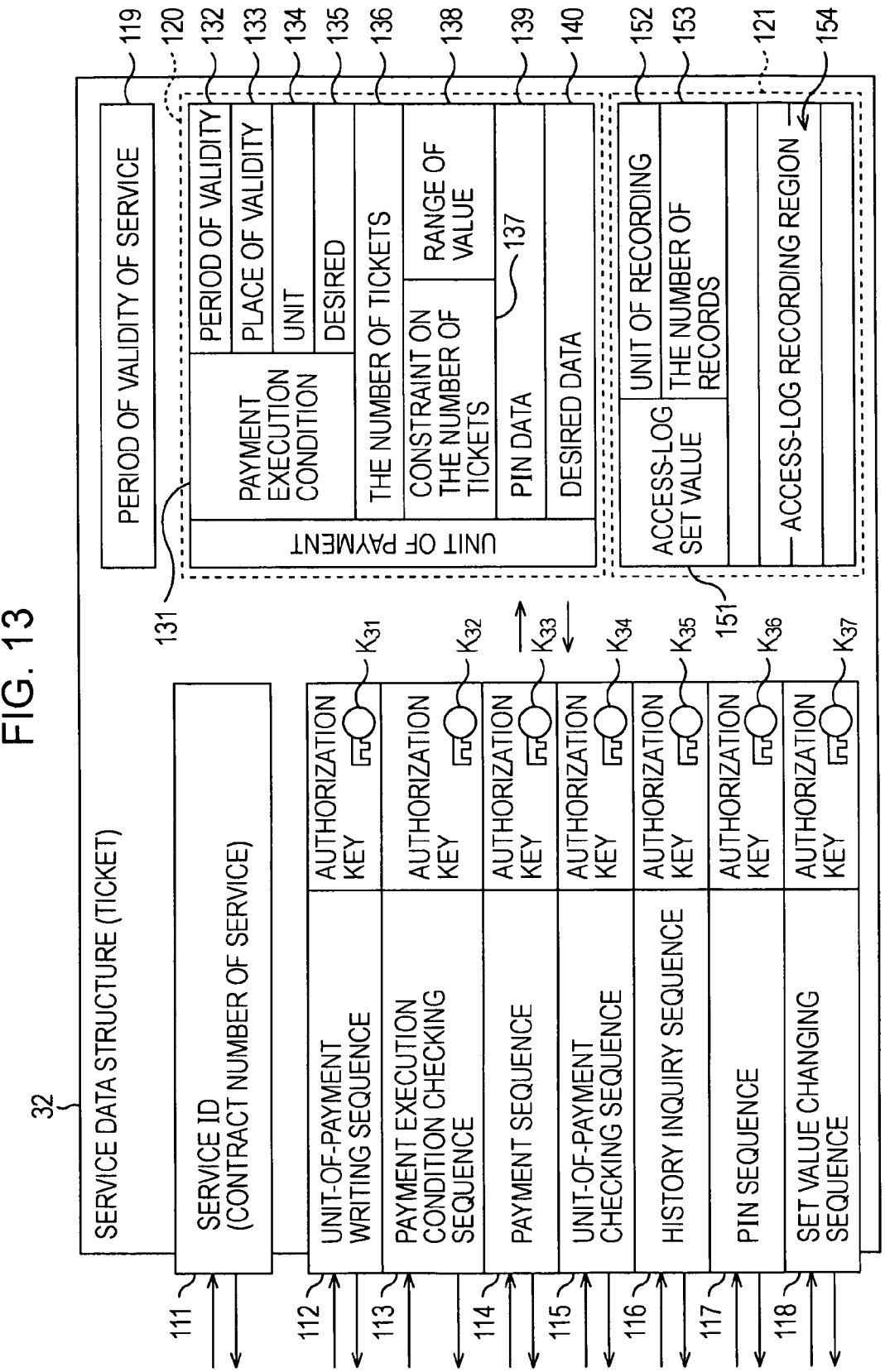
FIG. 13 is an illustration showing an example of a service data structure 32 in FIG. 6.

FIG. 13 is an illustration showing an example of the service data structure 32 in FIG. 6. As described above, the service data structure 32 is a service data structure for managing data necessary for a ticket application and is managed by the ticket object 52.

As shown in FIG. 13, the service data structure 32 is basically categorized into a service ID area 111, processing sequence areas 112 to 118, and data storage areas 119 to 121, which are areas in which specific data within the service data structure is stored.

The service ID area 111 is an area in which a value corresponding to a number assigned, as a contract number of an application, to the user of the IC card 2 is stored. A unique value is adopted within an application of a single application server (in the example of FIG. 13, a ticket application). Thus, the service data structure 32 is identified by a command issued by the reader/writer 41.

The processing sequence areas 112 to 118 are areas in which values identifying groups of processing steps that can be called from the reader/writer 41 (programs describing processing sequences) are stored.

In the example of FIG. 13, programs describing processing sequences, such as a unit-of-payment writing sequence, a payment execution condition checking sequence, a payment sequence, a unit-of-payment checking sequence, a history inquiry sequence, a PIN sequence, and a set value changing sequence, are stored in the processing sequence areas 112 to 118, respectively.

The unit-of-payment writing sequence defines processing steps for adding value (increasing the number of tickets) stored in a number-of-tickets region 136 of the data storage area 120. Here, in a case where an application to be implemented is a ticket application, payment represents a reduction in the number of remaining electronic tickets, such as tickets for concerts or tickets for transportation, which is in exchange for reception of the provision of the application by the user of the IC card 2.

The payment execution condition checking sequence defines processing steps for checking a payment execution condition. The payment sequence defines processing steps for reducing the number of tickets (use of a ticket) represented by a value stored in the number-of-tickets region 136.

The unit-of-payment checking sequence defines processing steps for checking which information is to be used as a unit in payment. The history inquiry sequence defines processing steps for checking an access log represented by information stored in the data storage area 121. The PIN sequence defines processing steps for providing access restriction using a PIN and processing steps for releasing access restriction for data managed by the service data structure 32. The set value changing sequence defines processing steps for changing a set value that can be changed at the time of operation among values stored in the data storage areas 119 to 121.

In addition, in the example of FIG. 13, authorization keys $K_{31}$ to $K_{37}$ are set for processing sequences described in programs stored in the processing sequence areas 112 to 118, respectively. It is assumed that in order to perform the processing sequences, mutual authentication using the individually set authorization keys $K_{31}$ to $K_{37}$ has been successfully performed.

The data storage area 119 is an area in which information indicating the period of validity of the entire service data structure 32 is stored.

The data storage area 120 is an area in which various types of information regarding payment are stored. The data storage area 120 is constituted by a payment execution condition region 131, a region 132, a region 133, a region 134, a region 135, the number-of-tickets region 136, a constraint-on-the-number-of-tickets region 137, a region 138, a PIN data region 139, and a desired data region 140.

The payment execution condition region 131 is a region in which information indicating a constraint condition on the execution of payment is stored. As conditions on the payment, for example, information indicating the period of validity of a ticket is stored in the region 132, information indicating the valid place of a ticket (such as a theater or a terminal) is stored in the region 133, information indicating a unit of payment regarding the number of tickets to be used, such as "three electronic tickets are reduced by a single payment transaction" is stored in the region 134, and desired information is stored in the region 135.

The number-of-tickets region 136 is a region in which information indicating the number of remaining electronic tickets is stored. Information indicating a constraint condition on the number of remaining electronic tickets is stored in the constraint-on-the-number-of-tickets region 137. As a constraint condition on the number of tickets, information indicating the range of the number of tickets, such as, for example, "the number of remaining tickets should be 0 or more and 10 or less", is stored in the region 138.

The PIN data region 139 is a region in which information on a PIN to be used on the occasion of PIN authentication is stored. The desired data region 140 is a region in which data that can be set in a desired manner by an application server is stored.

The data storage area 121 is an area in which information on an access log is stored. The data storage area 121 is constituted by an access-log set value region 151, a region 152, a region 153, and an access-log recording region 154. The configuration of the data storage area 121 is the same as the configuration of the data storage area 70 in FIG. 8.

That is, the region 152 for the access-log set value region 151 is a region in which information indicating a unit of recording of an access log is stored. The region 153 is a region in which information indicating the number of records is stored. The access-log recording region 154 is a region in which access logs are recorded in a FIFO method.

Figure 14:
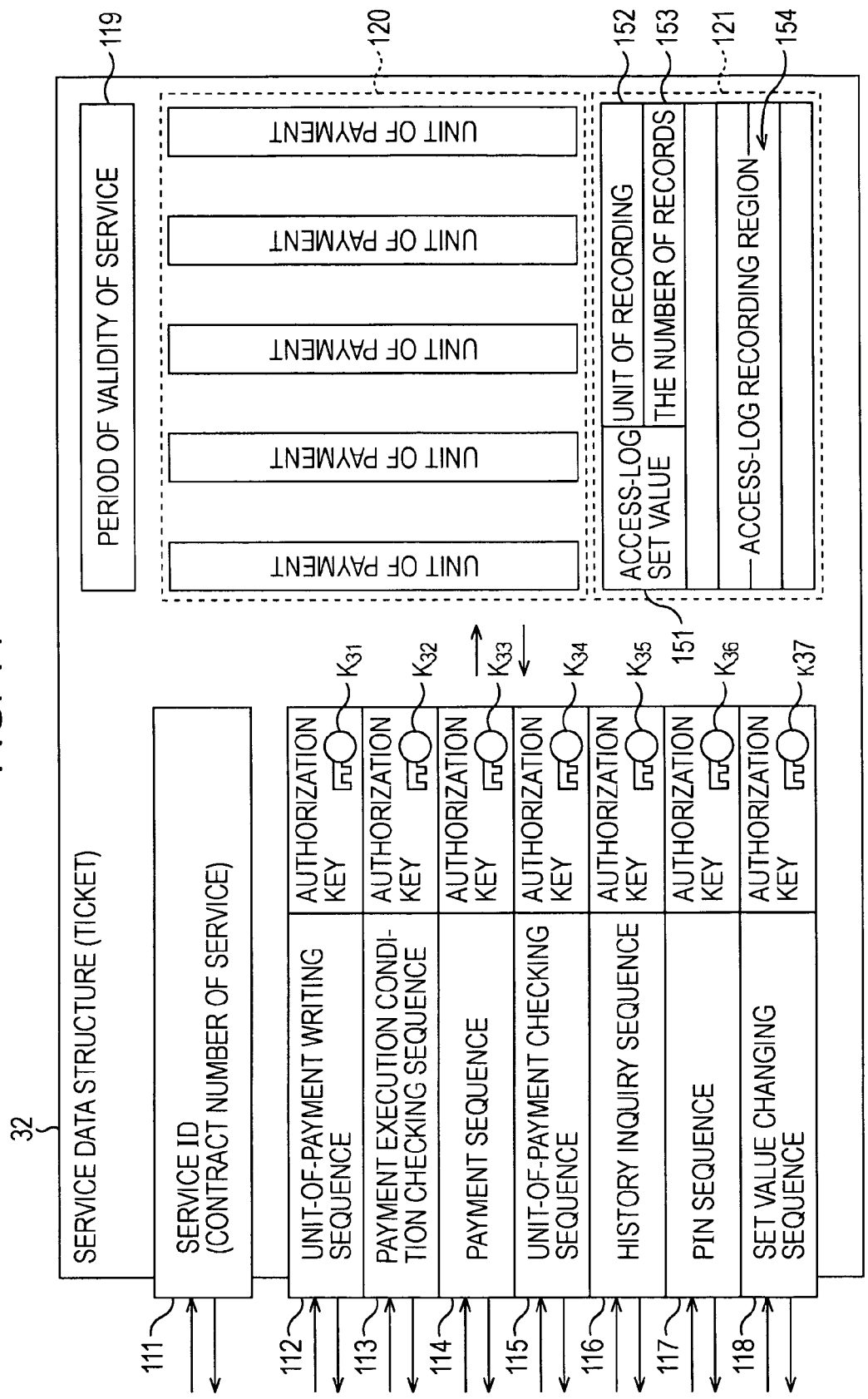
FIG. 14 is an illustration showing another example of the service data structure 32 in FIG. 6.

FIG. 14 is an illustration showing another example of the service data structure 32 in FIG. 6.

In the example of FIG. 14, five units of payments, only one of which is shown in the data storage area 120 in FIG. 13, are shown. The units of payment shown in FIG. 14 are used when the provision of different applications, such as information indicating an electronic ticket for a concert and an electronic ticket for transportation, is received. In a payment sequence, a unit of payment to be used is identified by a command parameter transmitted from the reader/writer 41, and payment is performed.

As described above, in a ticket application in which the service definition item "the number of units of payment that can be stored" is set to "plural" (FIG. 4), a plurality of units of payment can also be managed by the single service data structure 32.

In the above description, service data structures in a case where a prepaid electronic money application and a ticket application are implemented have been mainly explained. However, a similar service data structure can be used on the occasion of the management of information indicating various rights. The similar service data structure can be applied to management of rights represented by, for example, a railway commuter pass, a railway ticket, a point card, a stamp card, a coupon ticket, a theater appreciation ticket, a commutation ticket, electronic money, a credit card, a cash card, a debit card, an employee ID card, a written guarantee, a door key, an identification card, an access control card, and the like.

The above-described series of processing operations can be performed by hardware or software. In a case where the series of processing operations is performed by software, a program constituting the software is installed from a program recording medium into a computer built in dedicated hardware or, for example, a general-purpose personal computer capable of performing various functions by various programs being installed thereon.

Figure 15:
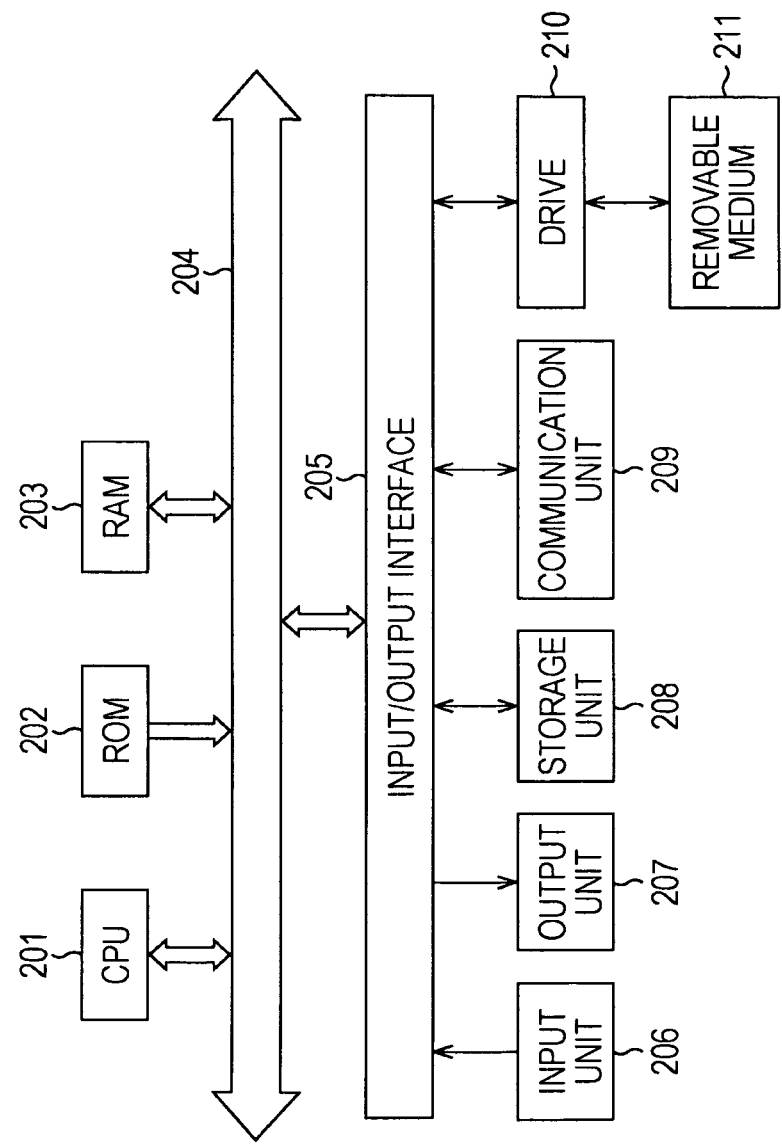
FIG. 15 is a block diagram showing an example of the configuration of a personal computer.

FIG. 15 is a block diagram showing an example of the configuration of a personal computer that performs the above-described series of processing operations by a program.

A CPU (Central Processing Unit) 201 performs various types of processing in accordance with a program stored in a ROM (Read Only Memory) 202 or a storage unit 208. A program to be performed by the CPU 201, data, and the like are stored in a RAM (Random Access Memory) 203, where appropriate.

The CPU 201, the ROM 202, and the RAM 203 are connected to each other via a bus 204.

An input/output interface 205 is connected to the CPU through the bus 204. An input unit 206 constituted by a keyboard, a mouse, a microphone, and the like and an output unit 207 constituted by a display, a speaker, and the like are connected to the input/output interface 205. The CPU 201 performs various types of processing in accordance with instructions input by the input unit 206. The CPU 201 outputs a processing result to the output unit 207.

The storage unit 208 connected to the input/output interface 205 is constituted by, for example, a hard disk. The storage unit 208 stores a program to be performed by the CPU 201 and various data. A communication unit 209 communicates with an external apparatus via a network, such as the Internet or a local area network.

When a removable medium 211, such as a magnetic disk, an optical disk, a magneto-optical disk, or a semiconductor memory, is installed in a drive 210 connected to the input/output interface 205, the drive 210 drives the removable medium 211 and obtains a program and data recorded in the removable medium 211. The obtained program and data are transferred to and stored in the storage unit 208 when necessary.

A program recording medium that is installed on a computer and that stores a program executable by the computer is constituted by the removable medium 211, which is a package medium, such as a magnetic disk (including a flexible disk), an optical disk (including a CD-ROM (Compact Disc-Read Only Memory) or a DVD (Digital Versatile Disc)), a magneto-optical disk, or a semiconductor memory, the ROM 202 in which a program is temporarily or permanently stored, or the hard disk forming the storage unit 208, as shown in FIG. 15. A program is stored into the program recording medium by using a wired or wireless communication medium, such as a local area network, the Internet, or digital satellite broadcasting, via the communication unit 209, which is an interface, such as a router or a modem, when necessary.

Note that in this specification, steps describing a program include not only processing operations performed in time series in accordance with the written order but also processing operations performed in parallel or independently, the processing operations being not necessarily performed in time series.

The invention claimed is:

1. An electronic apparatus comprising:
an IC chip that performs processing operations in accordance with a given command transmitted from an external reader/writer,
storing means for storing programs and data-structure information in association with a plurality of applications, each of the plurality of applications having data-structure information and more than one of the programs associated therewith, wherein:
the programs describe respective processing sequences including at least a payment processing sequence, a charge processing sequence, and a balance checking processing sequence, each of the processing sequences comprising a corresponding plurality of processing operations to be sequentially performed,
the processing operations included in the processing sequences described in the programs collectively include a processing operation to read data, a processing operation to write data, a processing operation to perform a calculation using data, and a processing operation to compare data, and
the data-structure information indicates a structure of data to be read and written by individual processing operations;
managing means for acquiring from the storing means a program that corresponds to the given command and is associated with an application of the plurality of applications that is identified by an identifier included in the given command, for acquiring the data-structure information that is associated with the application of the plurality of applications that is identified by the identifier included in the given command and for managing data to be read and written by the processing operations according to the processing sequence described in the acquired program as data having the structure represented by the information acquired from the storing means; and
control means for performing, in response to the given command, each of the processing operations according to the processing sequence described in the program corresponding to the given command that was acquired from the storing means and controlling reading and writing of the data whose structure is represented by the information acquired from the storing means,
wherein the performance of the processing operations according to the processing sequence described in the program corresponding to the given command depends on no commands transmitted from the external reader/writer other than the given command.

2. The electronic apparatus according to claim 1,
wherein the managing means sets a different authorization key for each of the processing sequences, and
wherein in a case where a processing operation according to a specific processing sequence is performed in accordance with the transmission of the given command from the reader/writer, before performing the processing operation, the control means performs mutual authentication between the electronic apparatus and the reader/writer by using a specific authorization key set for the specific processing sequence such that the specific authorization key must be provided for the control means to perform the specific processing sequence.

3. The electronic apparatus according to claim 1, wherein the managing means sets different authorization keys corresponding to individual data items having different contents, the data items constituting the data to be read and written.

4. The electronic apparatus according to claim 1, wherein the processing sequences further include a history inquiry sequence, a PIN sequence, and a set value changing sequence.

5. The electronic apparatus according to claim 1, wherein the payment processing sequence comprises the processing operations of:
reading data corresponding to a payment execution condition;
reading data corresponding to a period of validity of service;
reading data corresponding to a service-value balance;
calculating a reduced service-value balance based on a payment amount;
writing the reduced service-value balance as data corresponding to the service-value balance; and
writing access-log information.

6. A method of operating an electronic apparatus that includes an IC chip that performs processing operations, the method comprising:
receiving a given command transmitted from an external reader/writer;
storing programs and data-structure information in association with a plurality of applications, each of the plurality of applications having data-structure information and more than one of the programs associated therewith, wherein:
the programs describe respective processing sequences including at least a payment processing sequence, a charge processing sequence, and a balance checking processing sequence, each of the processing sequences comprising a corresponding plurality of processing operations to be sequentially performed,
the processing operations included in the processing sequences described in the programs collectively include a processing operation to read data, a processing operation to write data, a processing operation to perform a calculation using data, and a processing operation to compare data, and
the data-structure information indicates a structure of data to be read and written by individual processing operations;
acquiring a stored program that corresponds to the given command and is associated with an application of the plurality of applications that is identified by an identifier included in the given command;
acquiring the data-structure information that is associated with the application of the plurality of applications that is identified by the identifier included in the given command;
managing data to be read and written by the processing operations according to the processing sequence described in the acquired program as data having the structure represented by the information acquired from the storing means; and
performing, in response to the given command, each of the processing operations according to the processing sequence described in the program corresponding to the given command that was acquired from the storing means and controlling reading and writing of the data whose structure is represented by the information acquired from the storing means,
wherein the performance of the processing operations according to the processing sequence described in the program corresponding to the given command depends on no commands transmitted from the external reader/writer other than the given command.

7. A non-transitory computer readable medium having program code stored thereon, the program code being executable by a processor to cause the processor to perform operations comprising:
receiving a given command transmitted from an external reader/writer;
storing programs and data-structure information in association with a plurality of applications, each of the plurality of applications having data-structure information and more than one of the programs associated therewith, wherein:
the programs describe respective processing sequences including at least a payment processing sequence, a charge processing sequence, and a balance checking processing sequence, each of the processing sequences comprising a corresponding plurality of processing operations to be sequentially performed,
the processing operations included in the processing sequences described in the programs collectively include a processing operation to read data, a processing operation to write data, a processing operation to perform a calculation using data, and a processing operation to compare data, and
the data-structure information indicates a structure of data to be read and written by individual processing operations;
acquiring a stored program that corresponds to the given command and is associated with an application of the plurality of applications that is identified by an identifier included in the given command;
acquiring the data-structure information that is associated with the application of the plurality of applications that is identified by the identifier included in the given command;
managing data to be read and written by the processing operations according to the processing sequence described in the acquired program as data having the structure represented by the information acquired from the storing means; and
performing, in response to the given command, each of the processing operations according to the processing sequence described in the program corresponding to the given command that was acquired from the storing means and controlling reading and writing of the data whose structure is represented by the information acquired from the storing means,
wherein the performance of the processing operations according to the processing sequence described in the program corresponding to the given command depends on no commands transmitted from the external reader/writer other than the given command.

* * * * *